United States Patent [19]

Belady et al.

[11] 4,040,034
[45] Aug. 2, 1977

[54] DATA SECURITY SYSTEM EMPLOYING AUTOMATIC TIME STAMPING MECHANISM

[75] Inventors: Laszlo Antal Belady, Yorktown Heights; Carlo John Evangelisti, Jefferson Valley, both of N.Y.

[73] Assignee: International Business Machines Corporation, Armonk, N.Y.

[21] Appl. No.: 637,492

[22] Filed: Dec. 4, 1975

[51] Int. Cl.² ............................................. G06F 1/04
[52] U.S. Cl. ................................................ 364/200
[58] Field of Search ...................... 179/7.1 R; 346/42; 360/6; 340/172.5; 445/1

[56] References Cited

U.S. PATENT DOCUMENTS

| | | | |
|---|---|---|---|
| 3,419,881 | 12/1968 | Yamamoto et al. | 346/42 |
| 3,725,872 | 4/1973 | Balogh, Jr. et al. | 340/172.5 |
| 3,771,144 | 11/1973 | Belady et al. | 340/172.5 |
| 3,792,493 | 2/1974 | Hughes | 346/42 X |
| Re. 27,251 | 12/1971 | Amdahl et al. | 340/172.5 |

*Primary Examiner*—Harvey E. Springborn
*Attorney, Agent, or Firm*—Philip Young

[57] ABSTRACT

A data security system employing an automatic time-stamping mechanism for stamping a current time code in a data storage area or register associated with each storage section of a memory or an auxiliary storage device, such that each data read or write in a memory storage section updates the time code device. For every storage section of a memory, there is a time stamp storage element associated with it. Similarly, there is a time stamp storage element associated with every data channel. Whenever a storage section of memory is read from or written into the time stamp in the form of a unique binary number from a clock, indicating the current time of day and the date, is inserted into the time stamp storage element associated with that memory storage section. Examination of the contents of each time stamp storage element enables determination of whe the last read or write in a storage section occurred. A full memory address register is used to read or write data in the memory while only special high order bits of the memory address register are used to read or write the time stamp storage element associated with the memory storage section. The system provides a mechanism which automatically marks blocks of data with a time code as they are read from or written into memory and such mechanism cannot be bypassed by program means.

8 Claims, 26 Drawing Figures

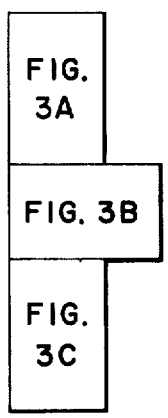
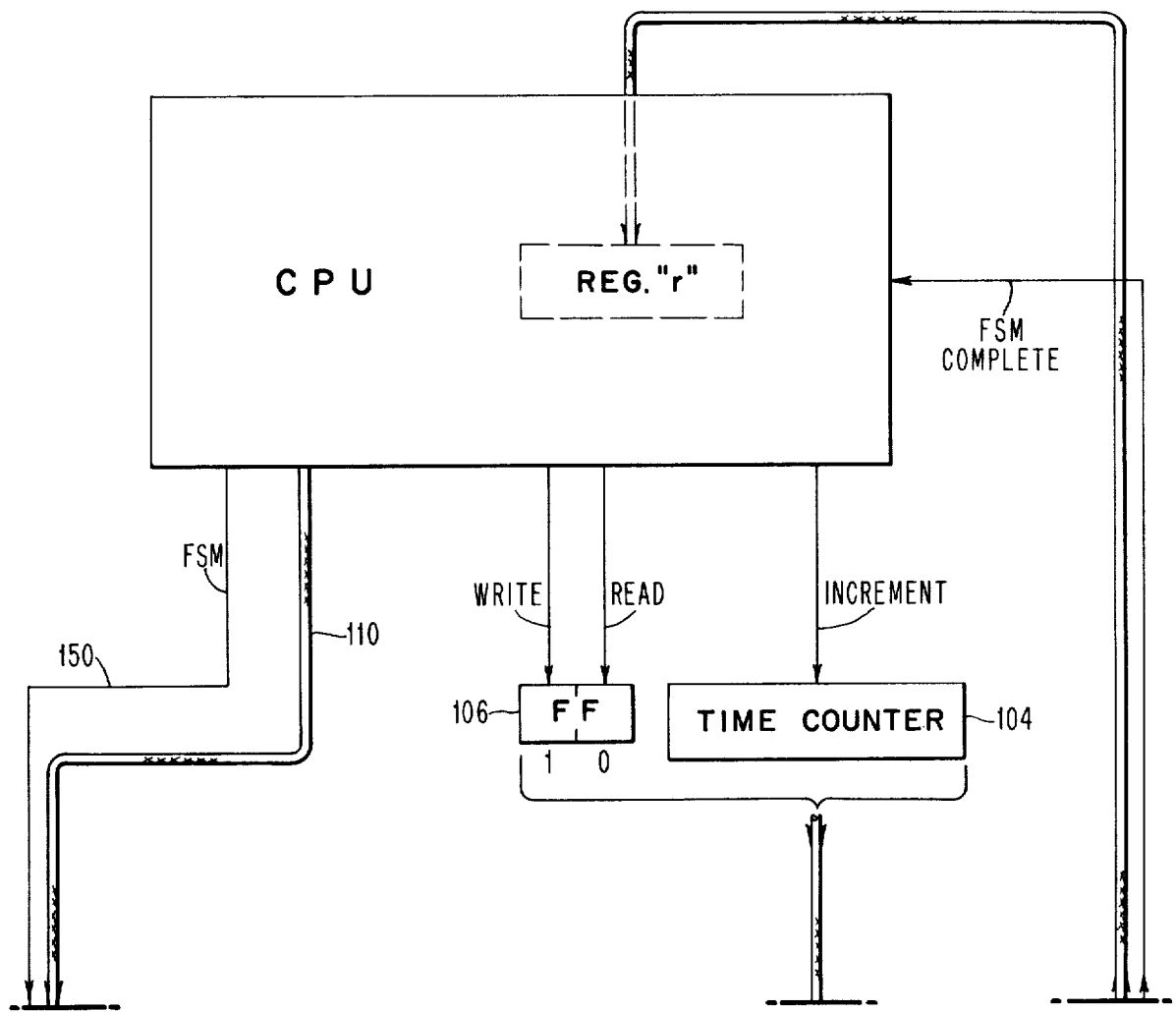
FIG. 3A

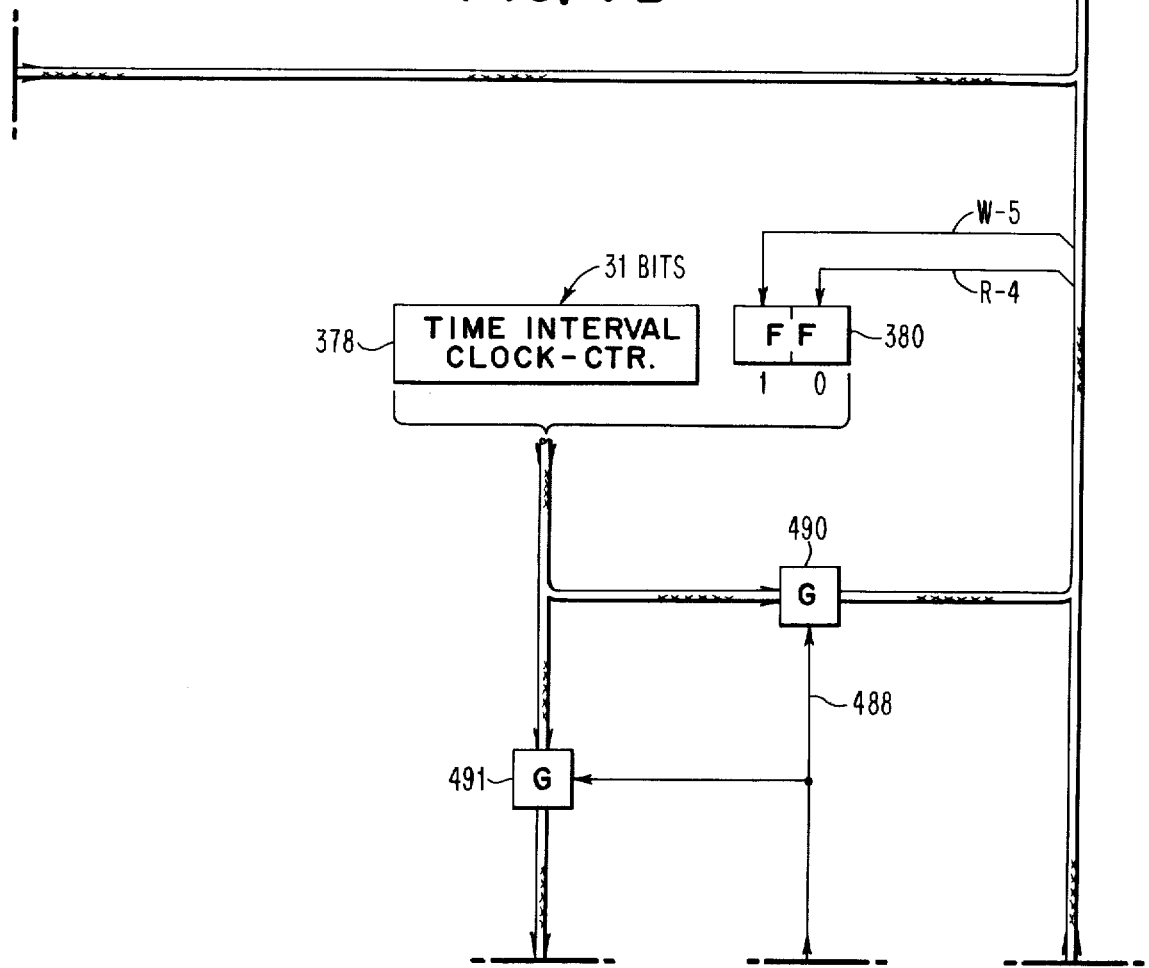

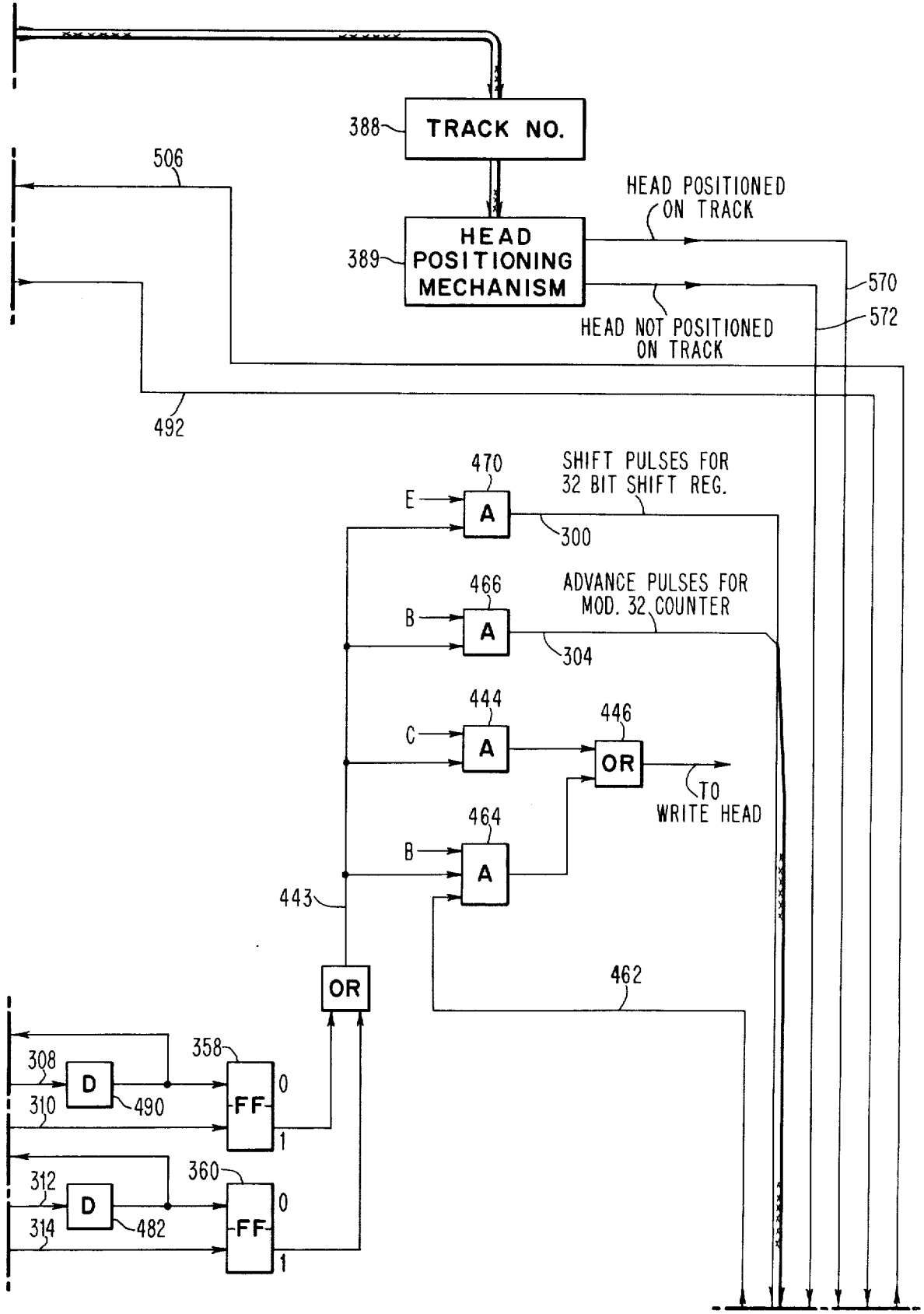

DATA SECURITY SYSTEM EMPLOYING AUTOMATIC TIME STAMPING MECHANISM

BACKGROUND OF THE INVENTION

The present invention relates to a data security system, and more particularly to computer data systems for indicating whether data has been accessed.

In many computer applications it is important to know whether a piece of data has been accessed during a given time interval, the end of such time interval often being the present time. One example of such situation is that of a stock broker transaction wherein a dishonest programmer could add his name today to the list of buyers or sellers of some earlier day's market, thus attaining financial gain based upon deterministic as opposed to probabilistic information. Such an act could not be detected since there is no explicit loss attributable to any account. Another application is where a user desires to monitor whether anyone has spied on, or destroyed by alteration, any data in an on-line system. In U.S. Pat. No. 3,599,159 issued on Aug. 10, 1971 to Creech et al and entitled "Digital Memory With Automatic Overwrite Protection," there is disclosed a multi-program system incorporating a memory protect feature whereby data can be written into only those memory locations available to the program being processed. In such system, each word in memory is provided with a special binary bit which indicates that a word is not to be modified or overwritten. The protect bit can be set at the time the word is stored in memory. When a memory is addressed, if the special binary bit is on, the existing word, which was stored in a buffer register, is written back into memory as part of the same memory cycle. At the same time, the presence of the memory protect bit signals an interrupt condition indicating that an inviolate portion of memory has been addressed.

In U.S. Pat. No. Re. 27,251, reissued on Dec. 21, 1971 to G. M. Amdahl et al, for a "Memory Protection System," there is disclosed a data processing system wherein blocks of addresses in a main memory are reserved to predetermined users. An auxiliary memory holds a key for each block of the main memory. During a memory accessing operation, the key that corresponds to the addressed block in main memory is read from the auxiliary memory and compared with the key assigned to the user. In the event of a mismatch, the user is prevented from altering the contents at the addressed location in the main memory.

While the known security systems provide various forms of data access protection by data encryption, memory access codes and software schemes, there is a need for a security system which detects and records the reading or writing of data in memory and which cannot be bypassed by a program.

SUMMARY OF THE INVENTION

It is an object of the present invention to provide a data security system which provides security at all times by automatically indicating when data is read from or written into memory. It is another object to provide a data security system which cannot be bypassed by software schemes. It is a further object to provide a system which indicates whether there has been access i.e., read or write, to any particular storage section of memory or data channel of an auxiliary storage device.

These and other objects are achieved by the present invention which provides a data security system employing an automatic time-stamping mechanism for stamping a time code in a storage element associated with each data storage section of a memory, such that each read or write of data updates the appropriate time stamp. A first instruction provides the fetch of time code with regard to the memory, and a second instruction provides the fetch with regard to information contained in the data channel corresponding to the auxiliary storage devices. For every storage section of a memory, there is a time stamp storage element associated with it. Similarly, there is a time stamp storage element associated with every data channel. Whenever a memory storage section is read from or written into is accessed, the time stamp in the form of a unique binary number from a continuously running clock, indicating the time of day and date, is inserted into the time stamp storage element associated with that memory storage section. Examination of the contents of each time stamp storage element enables determination of whether there has been access. A full memory address register is used to access data in the memory while only special high order bits of the memory address register are used to access the time stamp storage element associated with the memory storage section. In this fashion, the system provides a hardware mechanism which automatically marks blocks of data as they are read from or written into. The system permits detection of security violations and, as a result of the automatic time stamping and clock mechanism.

BRIEF DESCRIPTION OF THE DRAWINGS

FIGS. 3A, 3B and 3C are a wiring and logic diagram of the embodiment shown in FIG. 2;

FIG. 3 is a figure layout showing the interconnection of FIGS. 3A, 3B and 3C to form a complete system;

FIGS. 7A-7L show a complete wiring and logic diagram of the disk file embodiment of the present invention;

FIG. 7 is a figure layout showing the interconnection of FIGS. 7A-7L to form the complete disk file system;

DETAILS OF THE PREFERRED EMBODIMENTS

Figure 1:
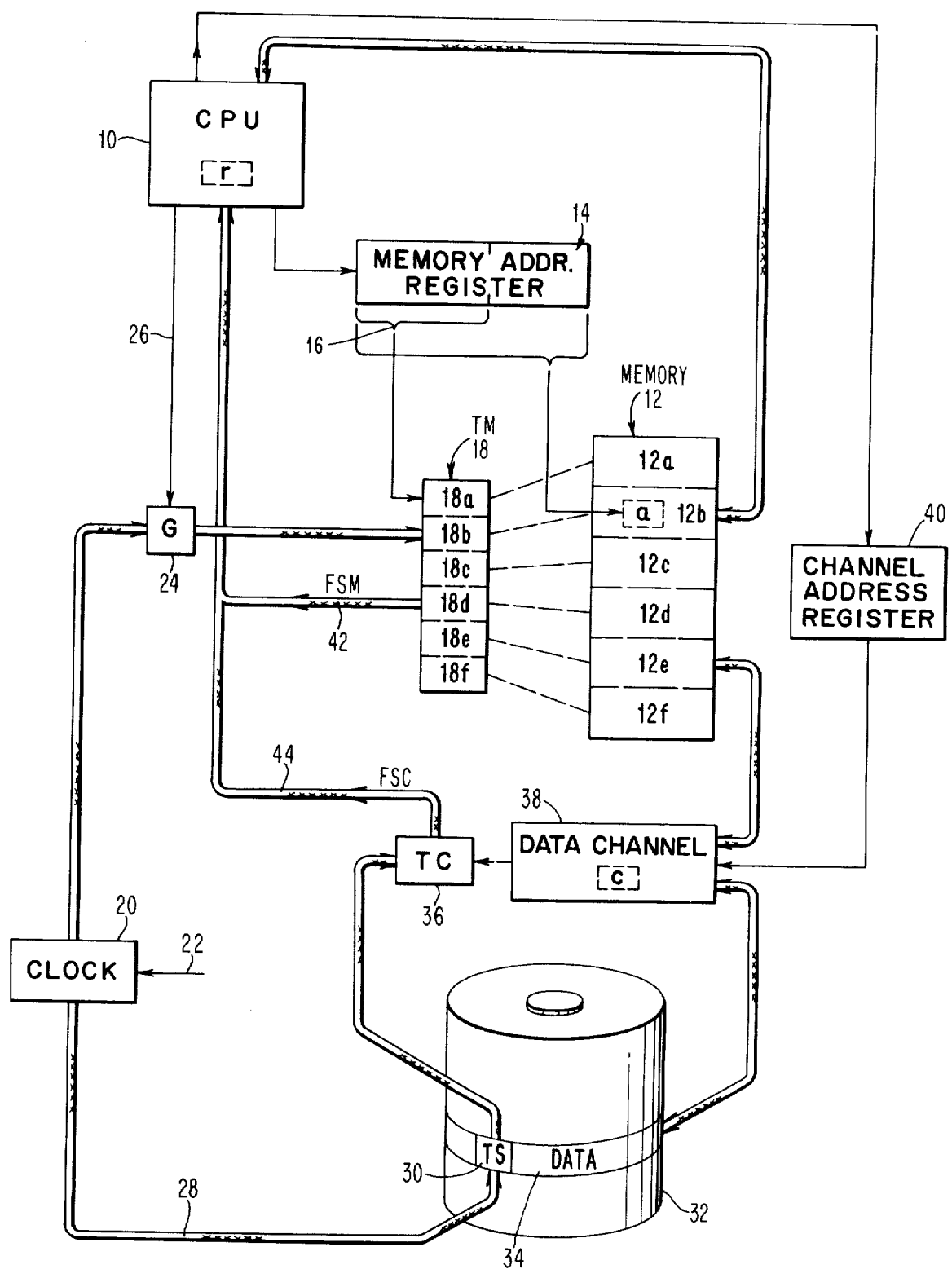
FIG. 1 is a block diagram of system employing the time stamp mechanism, illustrative of the present invention.

Referring to FIG. 1, there is shown a general block diagram of a system employing a time stamp tag register associated with each storage section in memory or associated with each envelope in a data channel, such that each access, i.e. read or write, of data updates a time stamp in the appropriate storage section. More specifically, there is shown a CPU 10 and a memory 12 having data which is accessible by the CPU. Reading and writing into the memory 12 is accomplished in conventional fashion except for the time stamping mechanism described herein. A memory address register (MAR) 14 is connected between the CPU 10 and memory 12 for accessing data in memory and includes a section 16 containing high order bits which are used to access a time stamp word associated with a storage section of memory 12. Each time stamp word is contained in a time stamp storage element indicated generally by numeral 18. More particularly for every storage section, 12a through 12f of the memory 12, there is a time stamp storage element 18a through 18f associated with it. Each storage section in the memory 12 is the basic unit with respect to time stamping for all data in system storage. The size of the storage section can vary from a bit to a page depending on the application considerations. It should be understood that as used herein the term "envelope" is defined as a storage section in memory 12 as shown by the sections 12a-12f and therefore such terms may be used interchangeably.

The system is provided with a clock 20 providing the desired time resolution, such as 1/64 of a second. Clock 20 receives a uniform pulsed input on line 22. The time signals from Clock 20 are inhibited from being entered into the time section (TM) 18 of memory 12 by means of a gate 24 which receives an inhibit signal on line 26 from the CPU. Clock 20 also provides time signals on line 28 to a time stamp word section (TS) 30 of an envelope of storage in a disk 32. Time stamp word 30 is associated with a data 34 in the disk 32. A time stamp register (TC) 36 is associated with each channel. The disk storage 32 is accessible by a data channel 38 which has associated with it a channel address register 40. The data channel 38 is connected to memory 12. Thus, memory 12 is accessible by the CPU 10 while the storage disk 32 is accessible by data channel 38. As mentioned previously, the clock 20 provides time signals at the appropriate time to both the time stamp section (TM) 18 and to the time stamp section (TS) 30. For every envelope in the memory 12, there is a time stamp TM and for every data channel 38, there is a time stamp register (TC) 36. The instructions FSM and FSC are used to retrieve values from TMs and TCs, respectively. The instruction (FSM, r, a) is an instruction to fetch the time stamp TM associated with the envelope, addressed by a (shown in memory 12), into register r of the CPU. It is noted that register r is a general register which is conventionally a part of the CPU. The FSC, r, c, is an instruction to fetch the time stamp TC associated with channel c into the register r of the CPU. The instructions FSM and FSC are shown on the lines 42 and 44, respectively, connected between the TM and TC sections and the CPU 10.

The time stamp word TS 30 associated with data on the storage device 32 is loaded into the TC register 36 when storage is read. The full memory address register (MAR) 14 is used to access the data in memory 12 while the high order bits of the MAR 14 are used to access the TM section 18. As mentioned previously, the channel address register (CAR) 40 is used to access the data in data channel 38.

The time stamp words may be as long as necessary in order to contain the contents of the clock 20. If it is desired to provide a distinction between whether the data was read from or written into the memory or disk storage, then an extra bit position can be added to each time stamp storage element. Thus the read/write bit would be on when writing and would be off when reading.

A description of the operation of the system of FIG. 1 follows whereby the various possible internal data transmissions will be described.

A. Transmission from CPU 10 to Memory 12

In this operation, the contents of the CPU register are entered into an addressed memory 12, the active bit is in the on position and the contents of clock 20 are entered into the associated time stamped word TM 18.

B. Transmission from Memory 12 to CPU 10

The contents of the addressed memory 12 is entered into the CPU register, the active bit is in the off position and the contents of the clock 20 are entered in the associated TM 18.

C. Transmission from Memory 12 to Storage Disk 32

The entire contents of the envelope of memory 12 is moved via the data channel 38 into the storage envelope 34, the active bit is in the off position, and the contents of clock 20 are entered into the associated TM 18 and TS 30.

D. Data Transmission from Storage Disk 32 to Memory 12

The entire contents of the storage envelope 34 are moved via the data channel into the memory envelope 12 a-f, and the active bit is in the on position. The contents of clock 20 are entered into the associated TM 18, the contents of the TS 30 are entered into TC 36 and the contents of clock 20 are entered into the TS.

It is noted that while the system shown in FIG. 1 employs a time stamp register in both the memory and the data channel of a back-up store or disk, other variations in the use of the time stamp mechanism are within the scope of the present invention, as will become more apparent from other embodiments described hereinafter.

Figure 2:
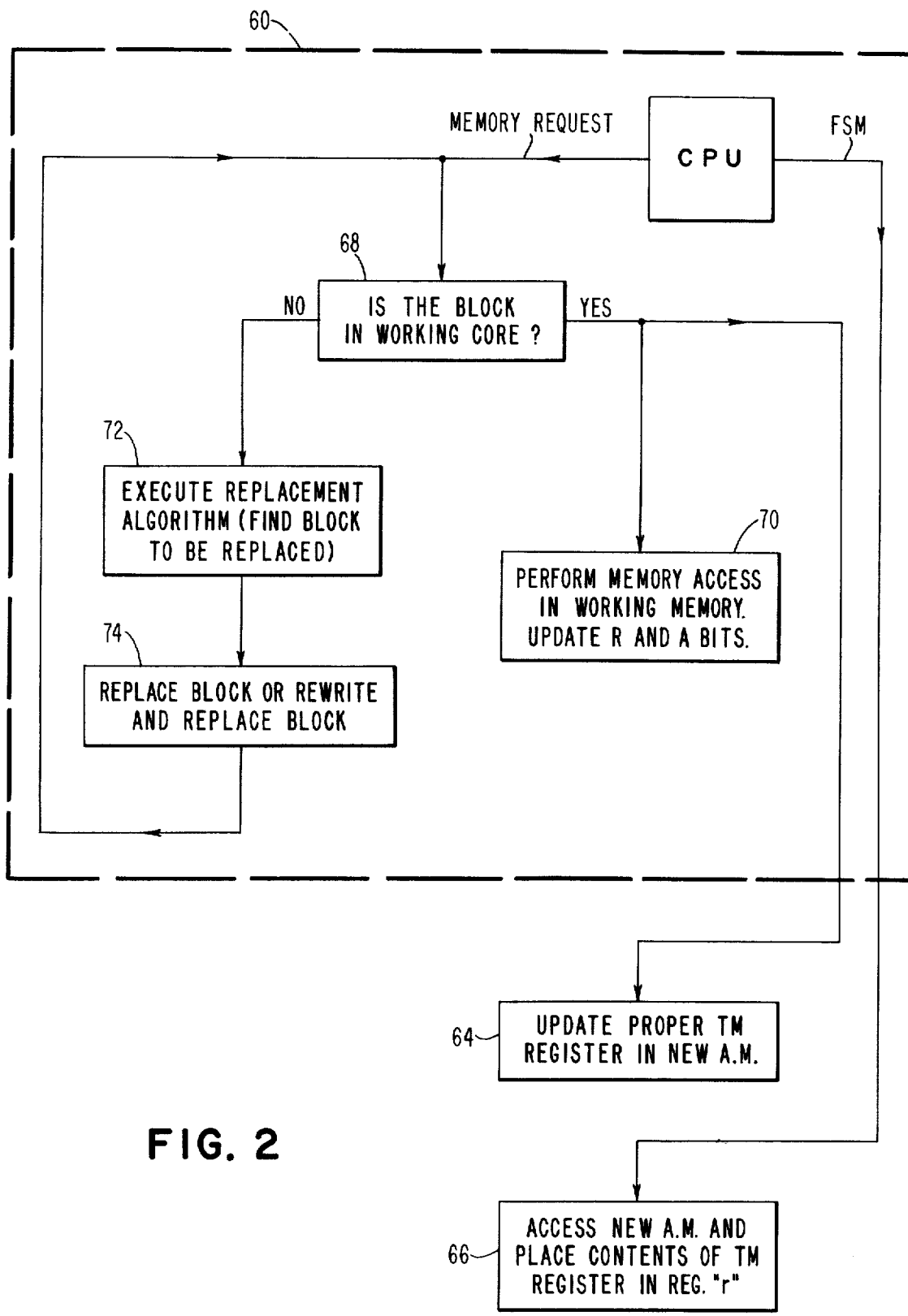
FIG. 2 is a flow chart illustrative of the method of operation of an embodiment of the present invention in a virtual memory environment.

Referring to FIG. 2, there is shown a flow diagram of the operation of the system of the present invention. The system shown in FIG.1 includes as a basic element the central processing unit (CPU) 10, the large-capacity, low-speed back-up store or disc 32, a high-speed, low-capacity working core memory 12 and associated memory register 18 and the TC register 36. The back-up store 32 may, for example, be an IBM 1301 disc file, connected to core memory 12 which can be a high-speed magnetic core memory associated with any digital computer system, through data channel 38. Data channel 38 can, for example, be the channel of the IBM 7040 computer system or any of a variety of other channel devices capable of performing the required buffering and control functions. The data channel 38 accepts the serially applied information from the low-speed disc 32, assembles the bits into words and applies these words in parallel to the core memory 12. Data channel 38 is also capable of accepting words in parallel from the core memory 12 and applying the bits thereof serially to the disc store 32.

In order to illustrate the subject invention in a virtual memory environment, U.S. Pat. No. 3,541,529, issued on Nov. 17, 1970 to R. A. Nelson, will be used as a reference to illustrate one type of known virtual memory system which manages the movement of virtual storage blocks into and out of working memory. Here, the flow diagram shown in FIG. 1 of the Nelson patent has been condensed to simplify the description of the overall operation in the dotted line enclosure indicated by numeral 60 in FIG. 2 of the subject specification. The functions which have been added and are new to the system and operation shown in the Nelson patent are indicated in FIG. 2 by the numerals 64 and 66.

After the preliminary loading operations have been completed, the system is ready to perform the step indicated at function block 68 during which determination is made as to whether the block containing the word which it is desired to utilize is stored in core memory 12. When the program running on the computer requires a particular word of information, a check is made in function block 68 to determine if this word is in the high-speed store. If it is in the high-speed store, the information is retrieved and used as indicated by function block 70 wherein memory access in the working memory is made and R and A bits are updated. The associative memory, to be described and shown in detail in FIGS. 3A, 3B, 3C, 3D, 4, 5 and 6, has an entry for each of the block positions in core memory 12. Each of these entries contains five fields which are illustrated in a memory data register. Reading from left to right these fields are: a 1-bit A field (alteration field) which is set when the corresponding block in core memory 12 has its contents altered; a 1-bit R (reference) field which is set each time the corresponding block in core memory 12 is utilized and is reset when all of the entries in the associative memory have their R field set.

On the other hand, if in performing function 68 the word is not in the high-speed store, a search operation is performed as shown by function block 72 by executing a replacement algorithm to find the block to be replaced, and the function block 74 whereby the required word is transferred from the low-speed, back-up store 32 to the high-speed store or memory 12. In this fashion, a low-capacity, high-speed store is provided and programs are written as if all the information were in this high-speed store 12. When a determination is made that a word of information is required from the back-up store 32, a transfer of the block containing this word is made from the back-up store 32 to the high-speed store 12.

Figure 3B:
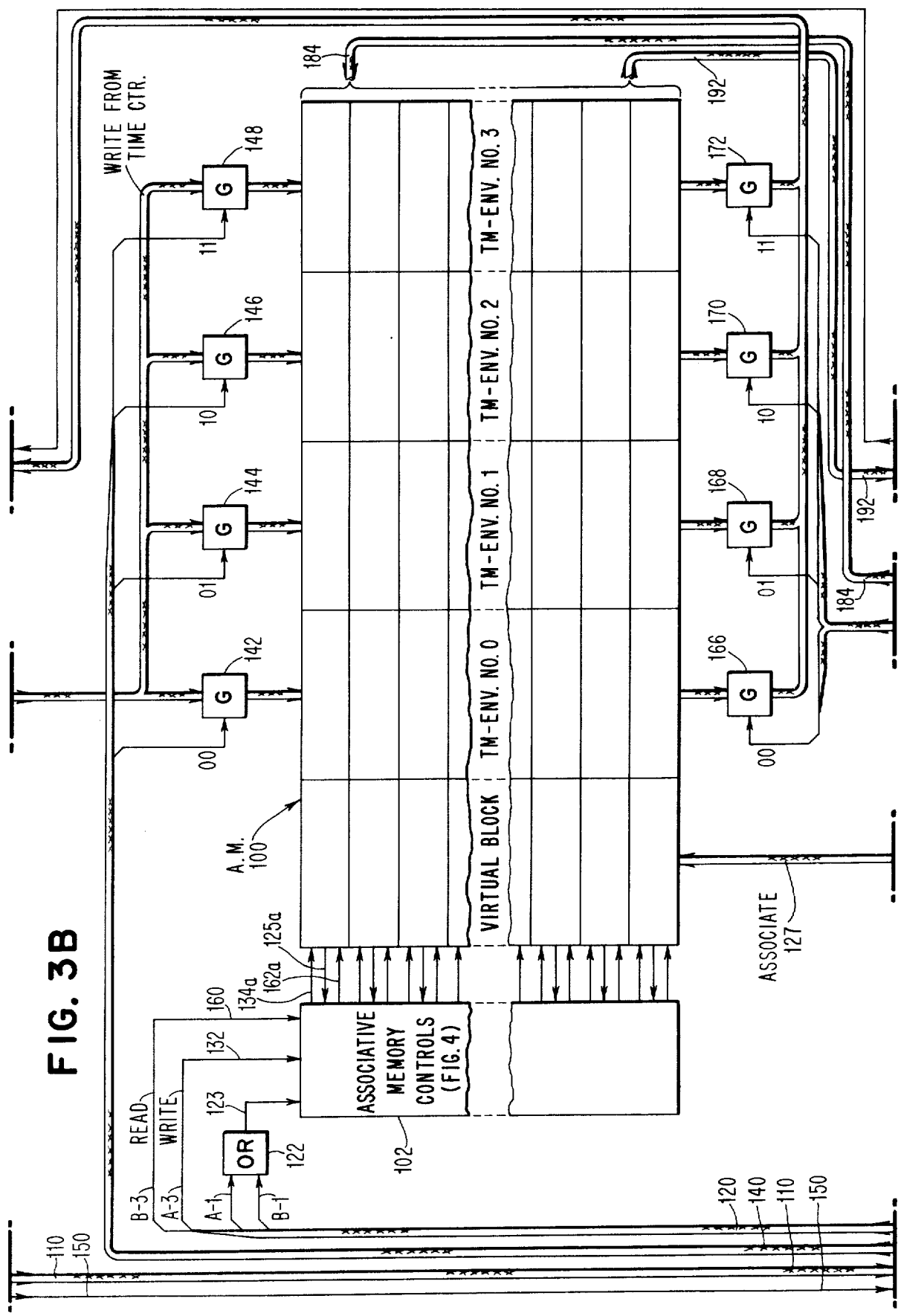
Figure 3C:
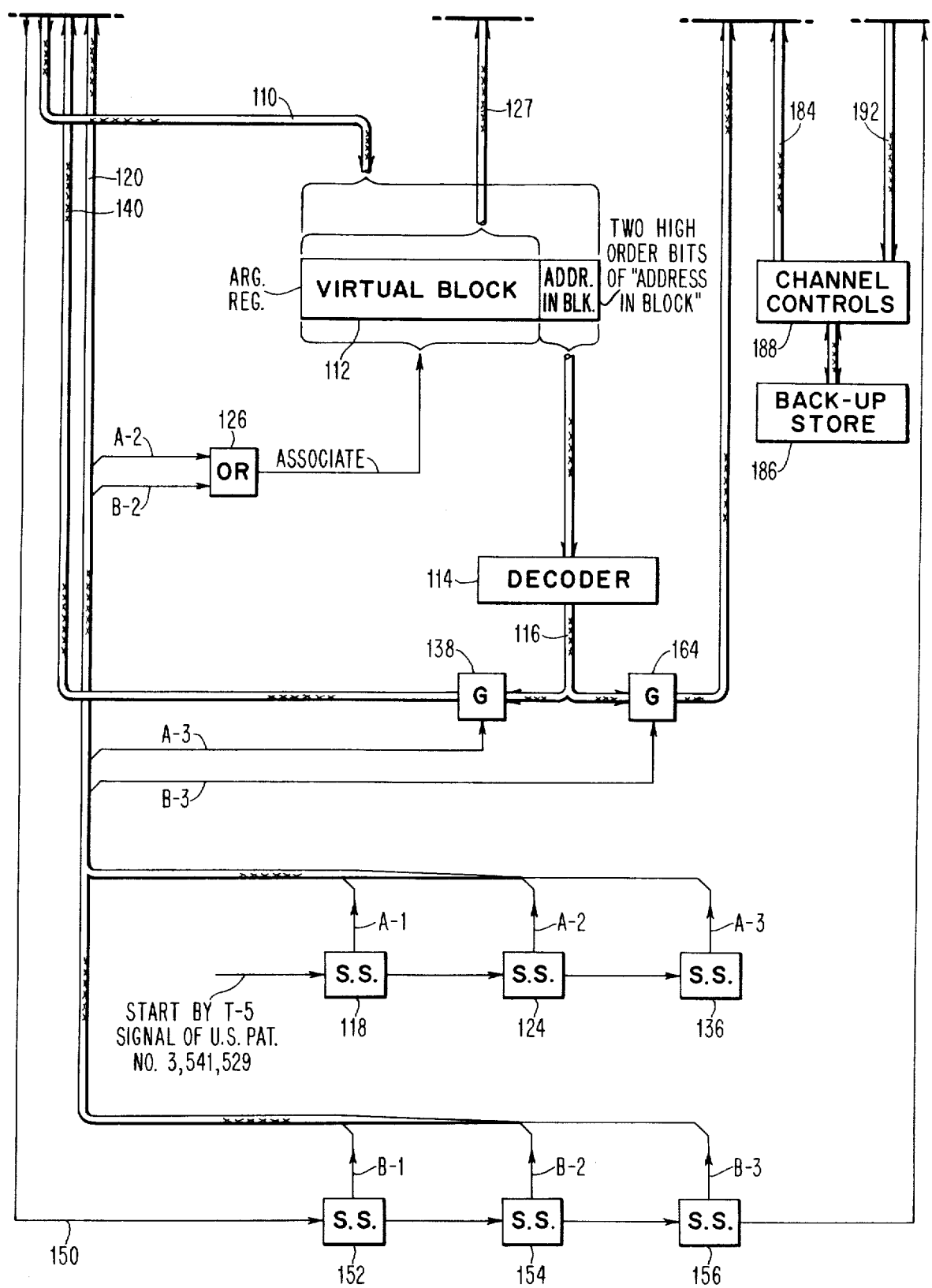

Referring to FIGS. 3A, 3B and 3C, there are shown circuit diagrams which interconnect in accordance with the format shown in FIG. 3 and constitute the virtual memory embodiment of the present invention. A feature of this embodiment is the associative memory shown on FIG. 3B. The associative memory keeps a list of the times that each envelope in a virtual block has been accessed and indicates whether it was a "read" access or a "write" access. The associative memory is generally indicated by the reference character 100. The associative memory controls are indicated by the reference character 102 and are shown in detail in FIG. 4. In this embodiment, it is assumed that each virtual block is divided into four "envelopes or storage sections." These envelopes can be addressed by the two high order bits in the "address in block" in register 112 shown in FIG. 3C. This address is available from the CPU, each time a memory request is made or when the special instruction "FSM" is made. This special instruction will be described in more detail at a later portion of this specification.

The contents of the time counter or clock 104 in FIG. 3A is a bit word which is incremented every 1/64th of a second by the CPU which is running when power for the computing system is on. Another bit is provided from the flip-flop 106 which is set to 1 when the memory access is a write access and set to 0 when the memory access is a read access. Thus, the "time stamp" word is a 33 bit word which can be gated into the proper TM register in the associative memory. On a memory access, the desired word in the associative memory 100 is found by associating on the virtual block field using the virtual block number as an argument. The selection of the TM register in the virtual block word is done by the two high order bits of the address in block. Thus, every time a word is read from or written into the working memory, the time stamp word will be written into the proper TM register for the envelope which contains the word which was either written or read.

The entire table contained in the associative memory 100 shown in FIG. 3B can be read off and stored in back-up store. When a particular program is being run on the computer, this table is brought from the back-up store and placed into the associative memory 100. The contents of the TM words in the associative memory 100 cannot be altered by the programmer in any way and they are only addressable by means of a special instruction which is called the "FSM" instruction. As shown by the function block 66 in FIG. 2, the instruction FSM can only obtain a TM word from the associative memory 100 and place it in a working register in the CPU called register $r$. The contents of register $r$ can be stored by the programmer at any time he wishes along with any other information that he wishes to store with it. Thus, at any time in the future he can again read the same TM register into register $r$ and, by means of programming, compare the value with the previous value that he has stored away in order to see if someone else has accessed the particular envelope since he did not.

As mentioned above, this embodiment employs the time stamp mechanism in the virtual memory environment described in the Nelson patent U.S. Pat. No. 3,541,529. The operation labeled 64 in FIG. 2 will now be explained in detail. Except where otherwise noted, the remaining description of this embodiment relates to the FIGS. 3A, 3B and 3C which are interconnected in one system as shown in FIG. 3. When the CPU requests a memory access, the virtual block number and the two high order bits of the address in block appear on cable 110 and are loaded into the argument register 112 in FIG. 3C. Flip-flop 106 is set either to a 1 or to a 0. The two high order bits of the address in block are applied to the decoder 114 and the output of the decoder will appear on cable 116. When the T-5 signal occurs, single shot 118 will be turned on. The T-5 signal, as described in the Nelson patent, initiates readout from the associative memory under control of match indicator flip-flops. This will produce the A-1 pulse which extends via cable 120 through OR circuit 122 to set via line 123 the match indicators in the associative memory control 102 to their 1 states. When single shot 118 turns off, a pulse will occur to turn on single shot 124. This produces the A-2 pulse which also extends via cable 120 and extends through OR circuit 126 to provide the associate pulse which is applied to the argument register 112. At the end of this pulse, only one of the match indicators in the associative memory control 102 will be left in its 1 state. This is because only one of the mismatch lines 125$a$–$n$ responds with no signal, indicating a match of the interrogated field in memory with the data set into the argument register 112.

Figure 4:
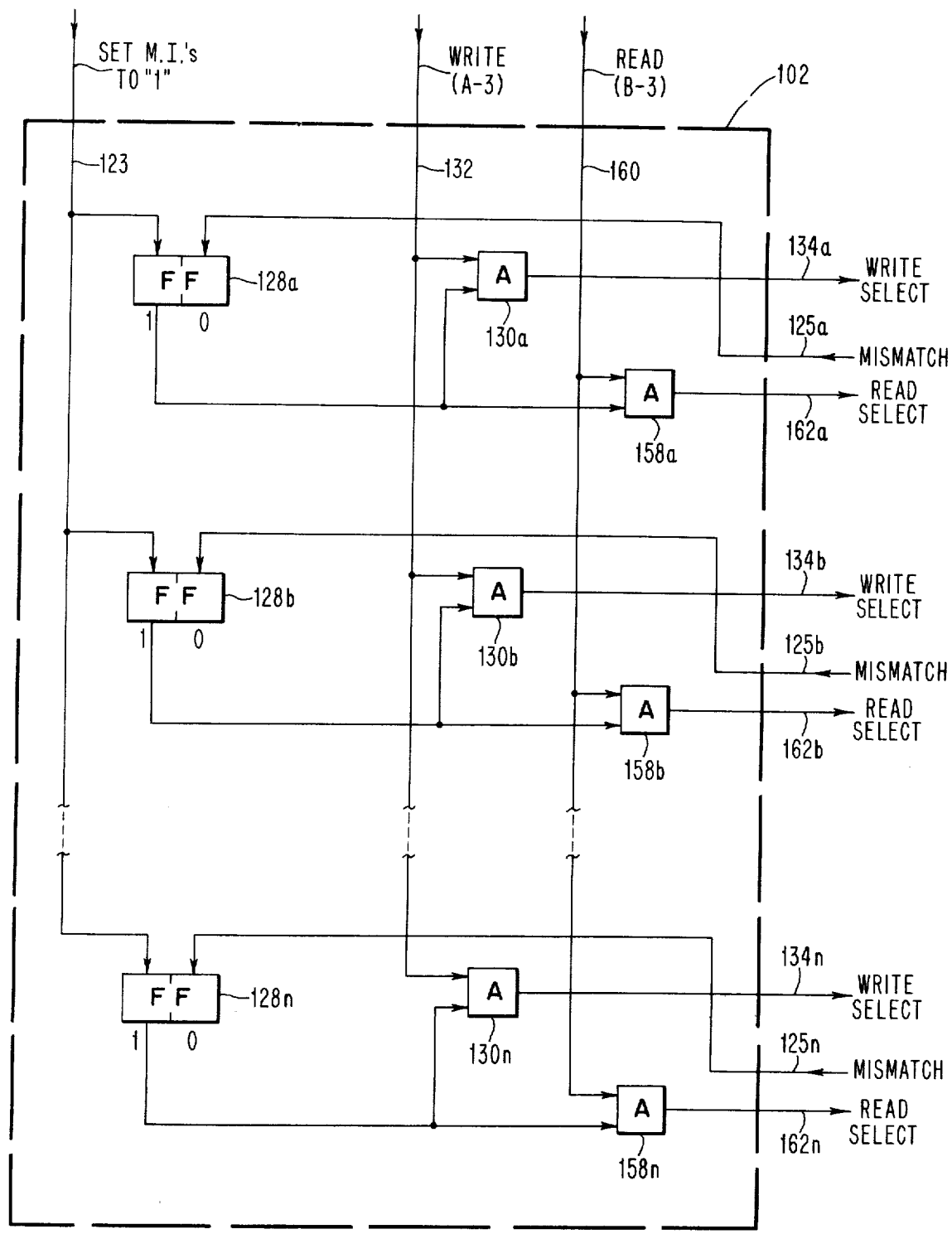
FIG. 4 is a detail of the associative memory controls.

Referring to FIG. 4 showing a detailed section of the associative memory controls 102, it will be noted that if one of the flip-flops 128a–n is in its 1 state, it will provide one input to its associated AND curcuit 130a–n. If a pulse is applied to the write line 132, the AND circuit 130a–n will have an output on its respective write select wire 134a–n. A write operation similar to this will be performed when the A-3 pulse is produced. When single shot 124 shown in FIG. 3C turns off, a pulse is produced which turns on single shot 136. This produces the A-3 pulse which as just explained extends via cable 120 and is applied to gate 138 in FIG. 3C. The output of the decoder 114 will now appear on cable 140 and one of the gates 142, 144, 146, and 148 of the associative memory 100 will be enabled. This will permit the contents of the time counter 104 and the flip-flop 106 to be gated into the proper TM register. In this manner, the proper TM register in the associative memory is updated for each memory access.

Table I below lists the above described A microprogram for entering the time stamp into the proper TM register in the associative memory 100.

TABLE I

| | "A" - MICROPROGRAM |
|---|---|
| Start | By the T5 signal described in the Nelson Patent No. 3,541,527 |
| A-1 | Set match indicators of associative memory controls 102 to "1" |
| A-2 | Associate on virtual block |
| A-3 | Gate decoder 114 to input gates 142, 144, 146, 148. Apply "write" pulse to associative memory 100. |

The execution of a FSM instruction will next be described. When this instruction is encountered, the argument register 112 is again loaded with the virtual block number and the two high order bits of the address in block as previously described for the memory access. A pulse also appears on line 150 out of the CPU and is used to turn on single shot 152. This produces the B-1 pulse which extends via cable 120 and also extends through OR circuit 122 to set the match indicators of the associative memory controls to their 1 states. When single shot 152 turns off, a pulse is produced to turn on single shot 154. This produces the B-2 pulse which extends via cable 120 and OR circuit 126 to provide the associate pulse. When single shot 154 turns off, single shot 156 is turned on. This produces the B-3 pulse which extends via cable 120 and provides the read pulse for the associative memory controls. To understand how this pulse works, reference can be made to FIG. 4 where it is seen that the 1 state of each flip-flop 128a–n will enable the AND circuit 158a–n so that when a pulse is applied to the read line 160, AND circuit 158a–n will have an output on its respective read select wire 162a–n. The B-3 pulse is also applied to GATE 164 shown in FIG. 3C in order to gate the output of decoder 114 to one of GATES 166, 168, 170 or 172. In this way, the proper TM word is obtained and gated to the register r in the CPU.

Table II below lists the B microprogram for executing the FSM instruction to fetch the time stamp word from the proper TM register in the associative memory 100.

TABLE II

| | "B" MICROPROGRAM |
|---|---|
| Start | By the active state of the FSM line from CPU |
| B-1 | Set match indicators of associative memory controls 102 to "1" |
| B-2 | Associate one virtual block |
| B-3 | Gate decoder 114 to output gates 166, 168, 170, 172. Apply "read" pulse to associative memory 100. |

Figure 5:
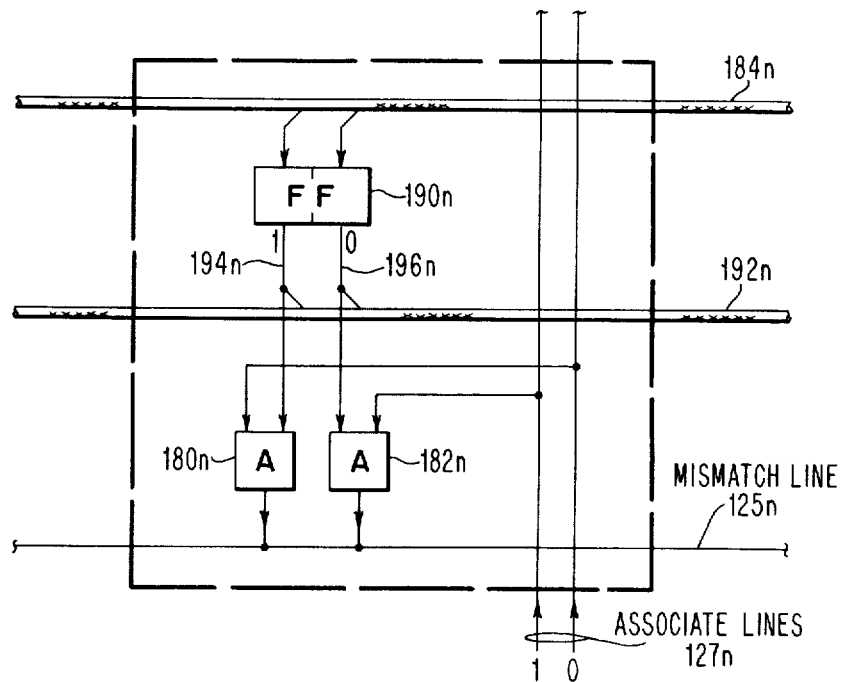
FIG. 5 is a detail of each memory element used in the virtual block register in the associative memory.

Referring to FIG. 5, there is shown a memory element used for the nth virtual block register in the associative memory 100. The associate cable, indicated by numeral 127, provides lines through 127n to the virtual block of the argument register 112. Associate lines 127n connect with AND gates 180n and 182n. A write line 184n extends from back-up store 186 under the control of data channel control 188 and connects with a flip flop 190n in the memory element. Similarly, a read line 192n extends from back-up store 186 via data channel control 188 and connects with flip-flop lines 194n and 196n leading into AND gates 180n and 182n, respectively. The output of AND gates 180n and 182n are connected to the mismatch line 125n described above.

Figure 6:
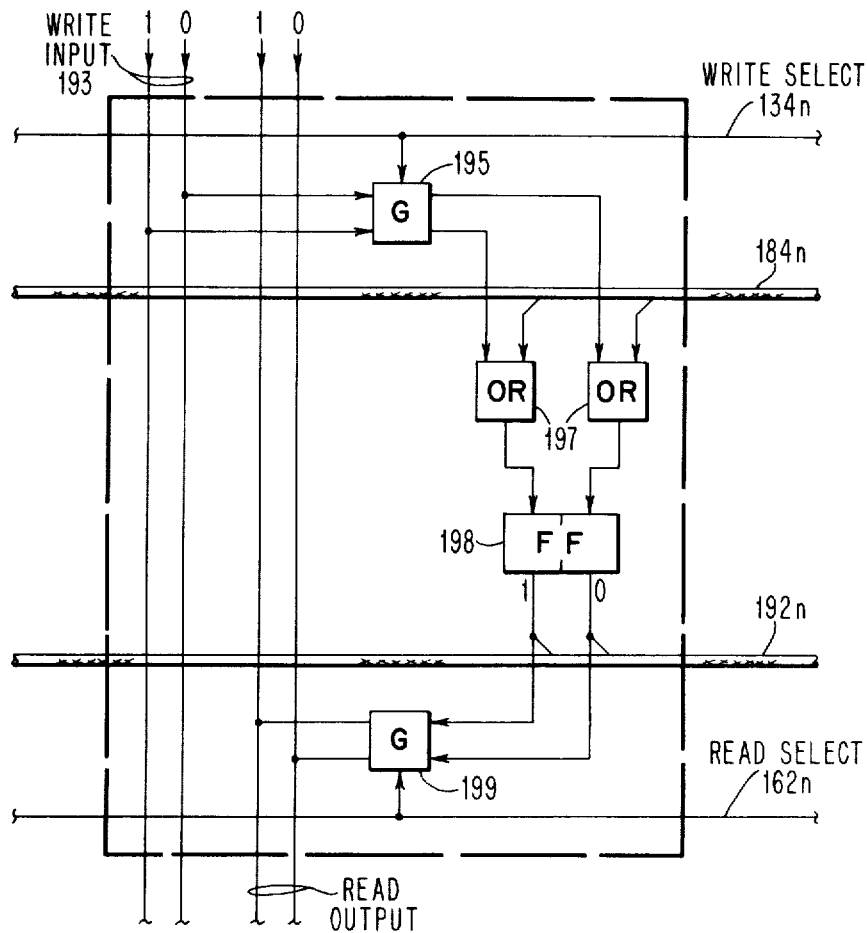
FIG. 6 is a detail of the memory element used for the "TM" registers in the associative memory.

Referring to FIG. 6, there is shown a memory element used for the time stamp (TM) registers in the associative memory 100. The memory element receives the signals on write select line 134n and the read select line 162n from the associative memory controls 102. Time count data is received on write time lines 193 from the counter 104 and input to a gate 195 which is enabled by a signal on write select line 134n. The output of gate 195 is applied to OR gates 197 which are also connected to the write line 184n from the back-up store 186. OR gates 197 provide an output to flip-flop 198 for storing the time count. The flip-flop 198 provides the time count associated with the memory element to both the back-up store on line 192n and to an output gate 199 as part of the output to gates 166, 168, 170 and 172 shown in FIG. 3B.

For a more detailed description of the operation of similar associative memories, reference is made to the above described Nelson patent U.S. Pat. No. 3,541,529 and also to U.S. Pat. No. 3,317,898 to H. Hellerman. For example, for illustrative purposes, argument register 112 could take the form of register shown in FIG. 7 of the last-mentioned patent.

DISK FILE EMBODIMENT

This embodiment relates to a disk file structure that has a space reserved along with each envelope of data. The reserved space contains the time when the envelope was last read from the disk or the time when the envelope was last written on the disk. A single bit of this time stamp word indicates read or write. If this bit is set to a 1, it indicates that the last access to the envelope was a write access and if this bit is set to 0, it indicates that the last access to the envelope was a read access.

It is noted that the type of magnetic recording used on the disk is the same as that described in the field engineering manual SY26-3671-5 for the IBM 2314 Direct Access Storage Facility, model 1 and A-series. The manual shows the type of non-return to zero recording that is employed on the disk and indicates how either a 0 or a 1 is recorded on the disk.

FIGS. 7A through 7L comprise a complete wiring and logic diagram of the disk file embodiment. FIG. 7 shows the interconnection of the FIGS. 7A–7L wherein each figure sheet is tied together by the electrical cables, lines or circuit elements shown.

Figure 8:
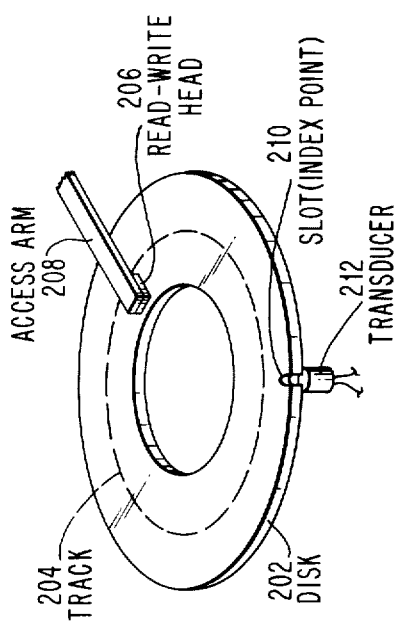
FIG. 8 is a perspective view of a single disk used with the system shown in FIGS. 7A-7L.

FIG. 8 is a perspective view of a single disk 202. Disk 202 can have many concentric tracks 204. A read-write head 206 is fastened to an access arm 208 which can be positioned so that the read-write head 206 is cooperating with the proper one of tracks 204. A slot or slug 210 at one index point in the periphery of the disk 202 is sensed by a transducer 212. This transducer 212 is stationary and provides one pulse per revolution of the disk 202.

Figure 9:
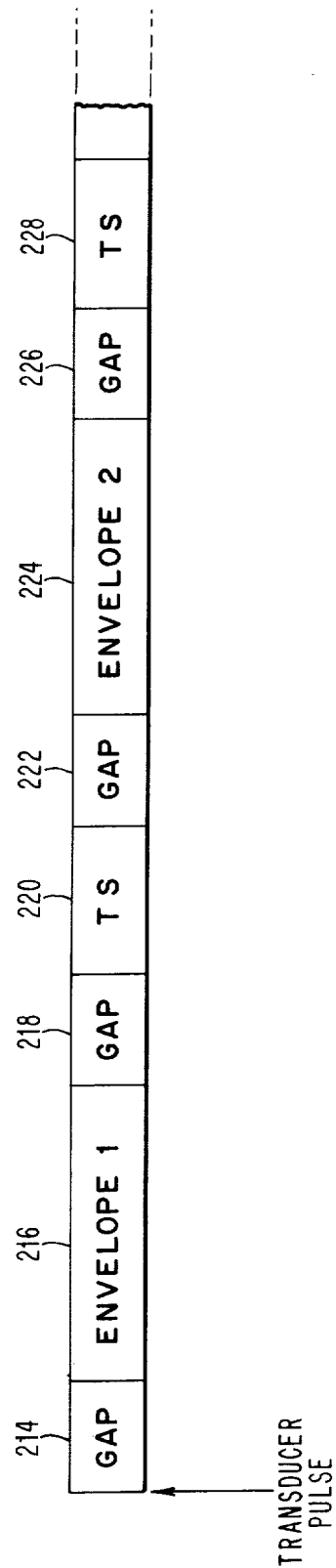
FIG. 9 is a diagram illustrating one track on the disk shown in FIG. 8.

FIG. 9 is a sketch which shows one track on the disk 202. There is an initial gap 214 which is followed by a first envelope 216 of data. Another gap 218 follows this, after which the time stamp word 220 is written which relates to the first envelope 216. After this first time stamp 220, another gap 222 occurs and a second envelope 224 is written on the disk followed by a gap 226, which again is followed by a time stamp word 228 which relates to the second envelope 224. For this embodiment it is assumed that there are two envelopes of data on a disk track, and each envelope would probably contain 1024 bytes of data or 8192 bits. As will be seen later in connection with the logic diagram, the number of bits in an envelope must be some multiple of 32. The time stamp word contains 32 bits, one bit of which is used to indicate whether the envelope was last written or read.

Figure 10:
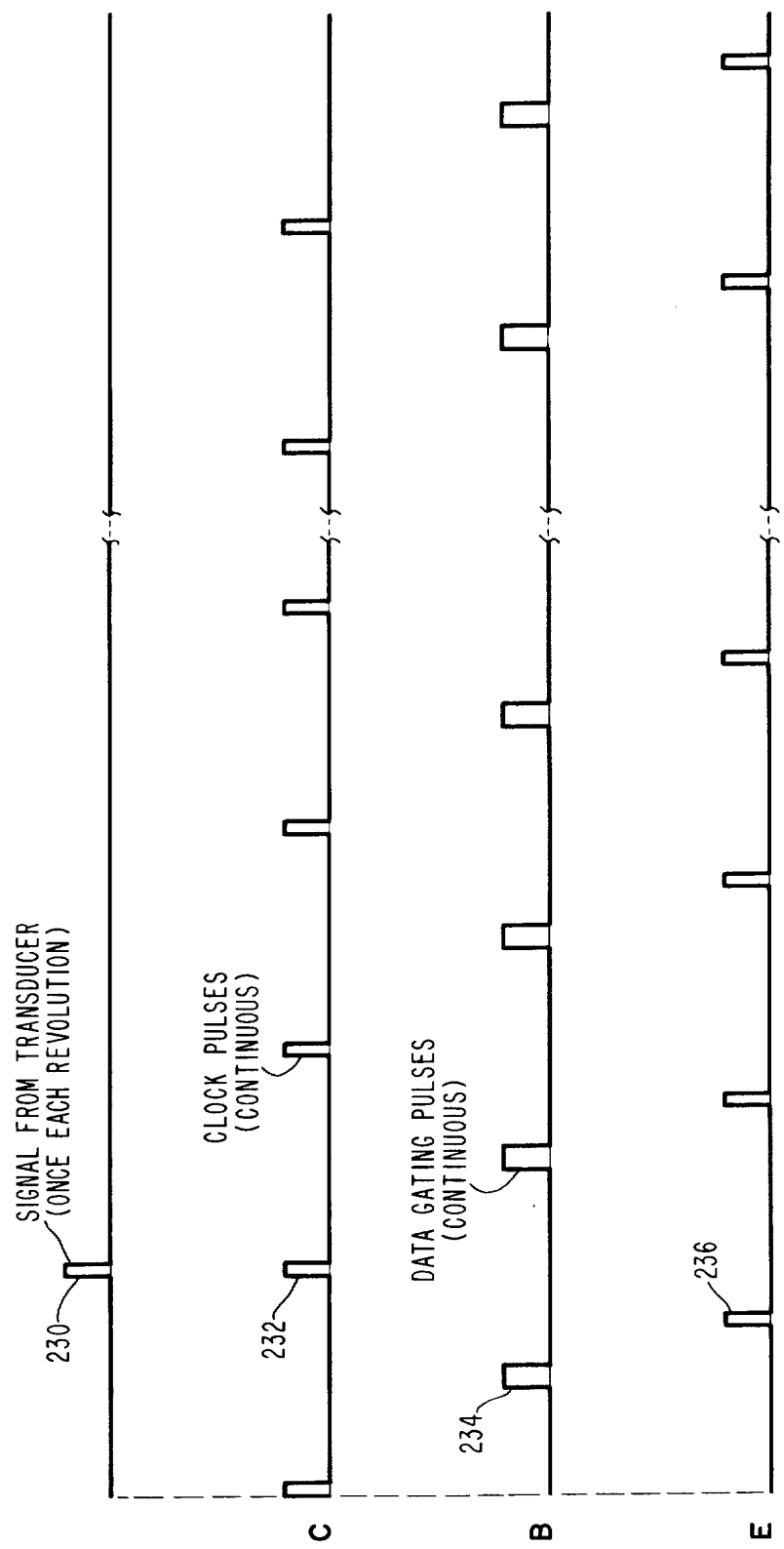
FIG. 10 is a timing chart showing the different pulses available from a pulse generator.

FIG. 10 is a timing chart showing the different pulses that are available from a pulse generator which is not shown. The signal from the transducer 212, shown in FIG. 8, is indicated by numeral 230 and occurs at each revolution of the disk. The C pulses, indicated by numeral 232, are generally referred to as clock pulses and are always present for every bit of data. The B pulses, indicated by numeral 234, are used to gate data and it will be observed that the B pulses occur in between the C pulses. The E pulses, indicated by numeral 236, are delayed slightly after the B pulses and are used in the embodiment to shift a 32 bit shift register.

Figure 11:
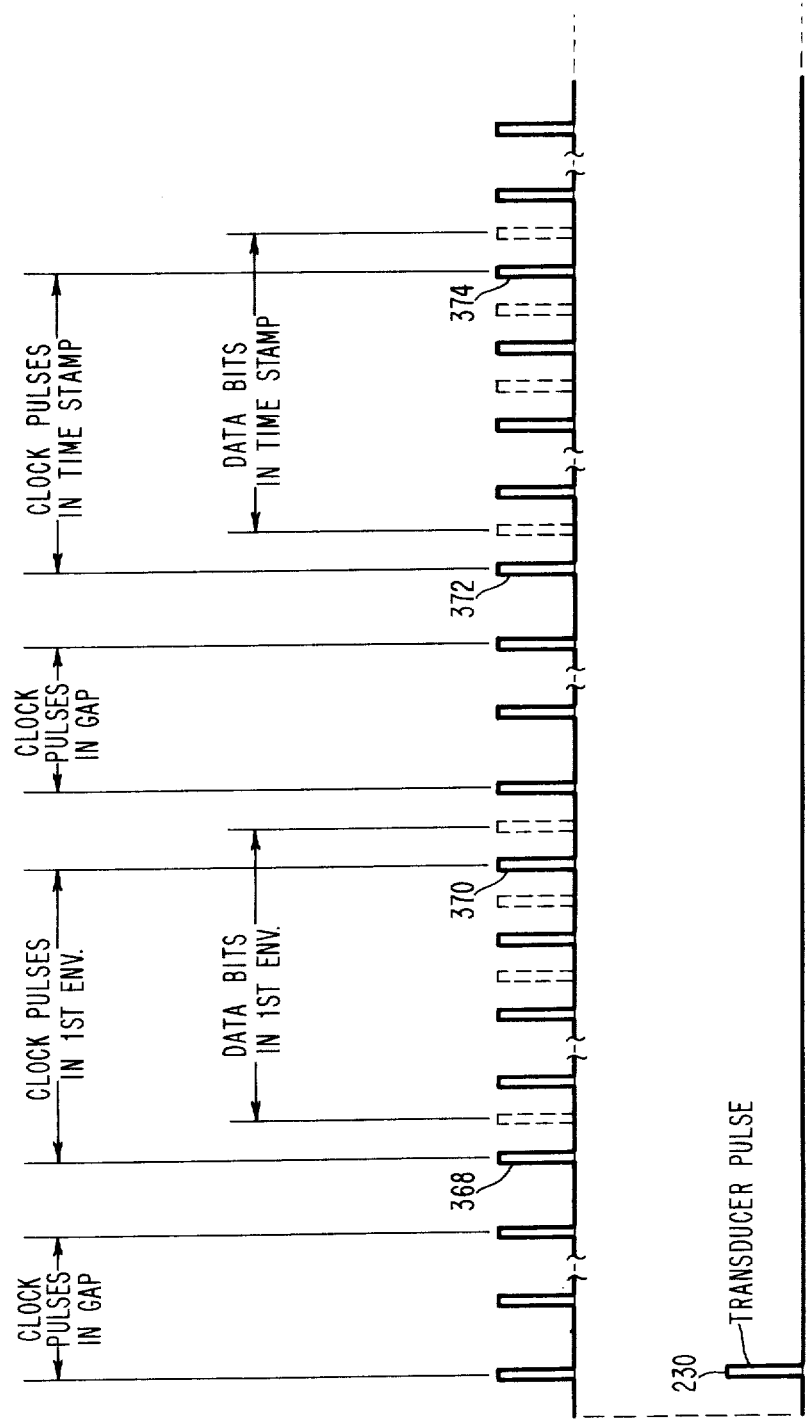
FIG. 11 shows the clock pulses and data bits appearing in the first envelope and the time stamp portions for the disk.

FIG. 11 shows how the clock pulses and the data bits might appear in the first envelope and also in the time stamp portion. The disk is synchronized with these clock pulses. The specific manner of doing this is not important in this embodiment. One way to do this is to employ an oscillator which supplies these C clock pulses, and to divide this frequency down to a suitable frequency for applying to a synchronous motor which is then directly coupled to the disk. In any event, the transducer pulse 230 shown on FIG. 11 occurs at the same time as a C pulse. The C pulses are always recorded on the disk and a 0 bit is indicated by the absence of a pulse following a clock pulse. The presence of a 1, is indicated by the presence of a pulse following a clock pulse. To find the location of an envelope or a time stamp on the disk, these clock pulses are counted starting with the first one which occurs in unison with the transducer pulse. Thus, the clock pulse which indicates the start of the first envelope is indicated on FIG. 11 by the reference character 368. The clock pulse which indicates the end of the first envelope is indicated by the reference character 370 on FIG. 11. The clock pulse which indicates the start of the first time stamp is indicated by the reference character 372 and the clock pulse which indicates the end of the time stamp is indicated by the reference character 374. It will be noted that the last data bit occurs slightly after the pulses 370 or 374.

Referring to the disk file embodiment of FIGS. 7A–7L, an instruction either to write an envelope to the disk or to read an envelope from the disk first appears in the instruction register 376. This instruction contains the starting address in the memory 377 which is also shown on FIG. 7A, the track nummber on the disk and the envelope number on the track. In this embodiment, it is assumed that the memory word has a length of 32 bits and that the envelope, as previously explained, is some multiple of 32 bits. A time interval clock-counter, indicated by the reference character 378, has 31 bits and associated with it is an indicator bit 380, the purpose of which has been previously explained.

Figure 7A:
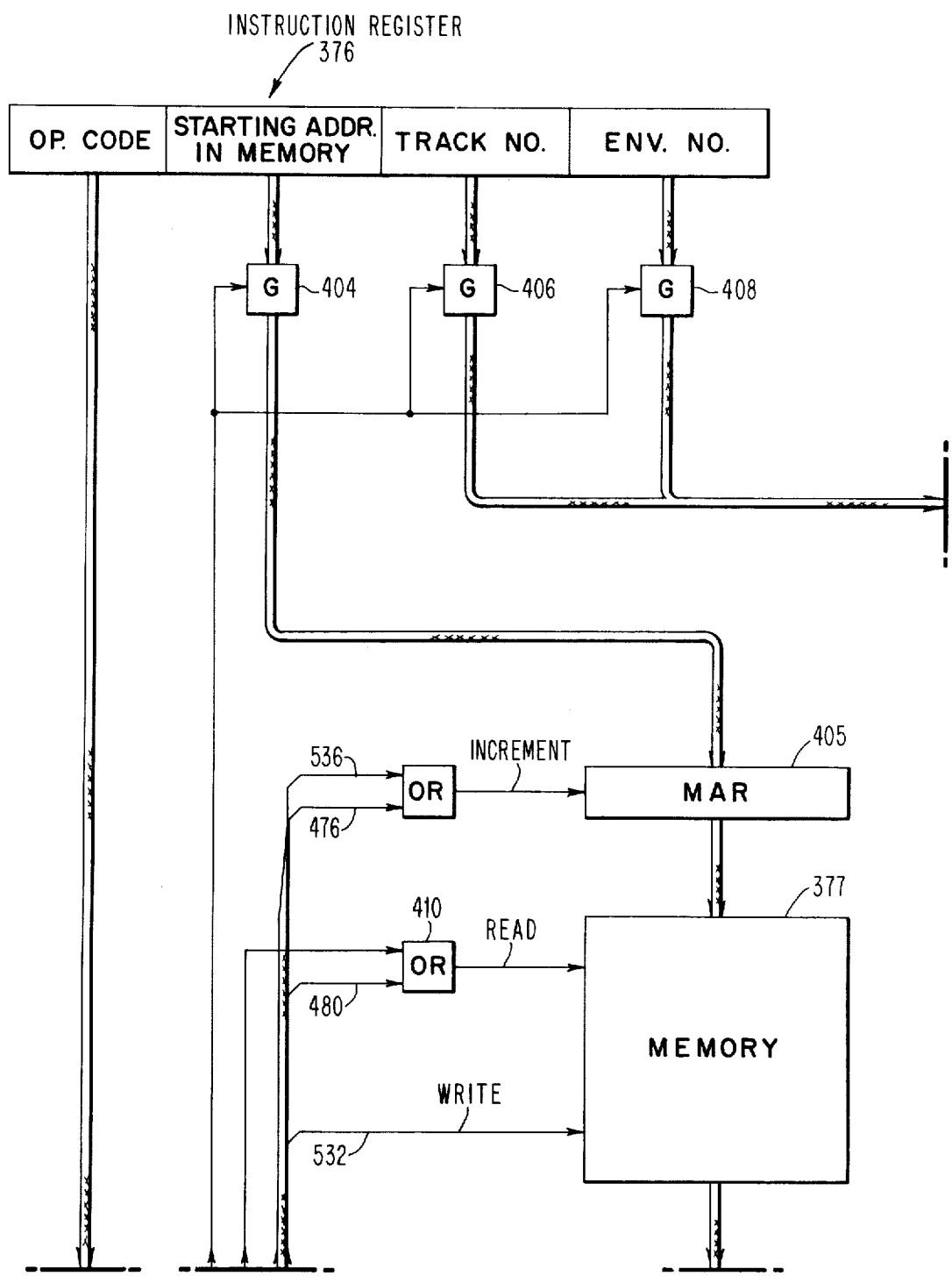
Figure 7C:
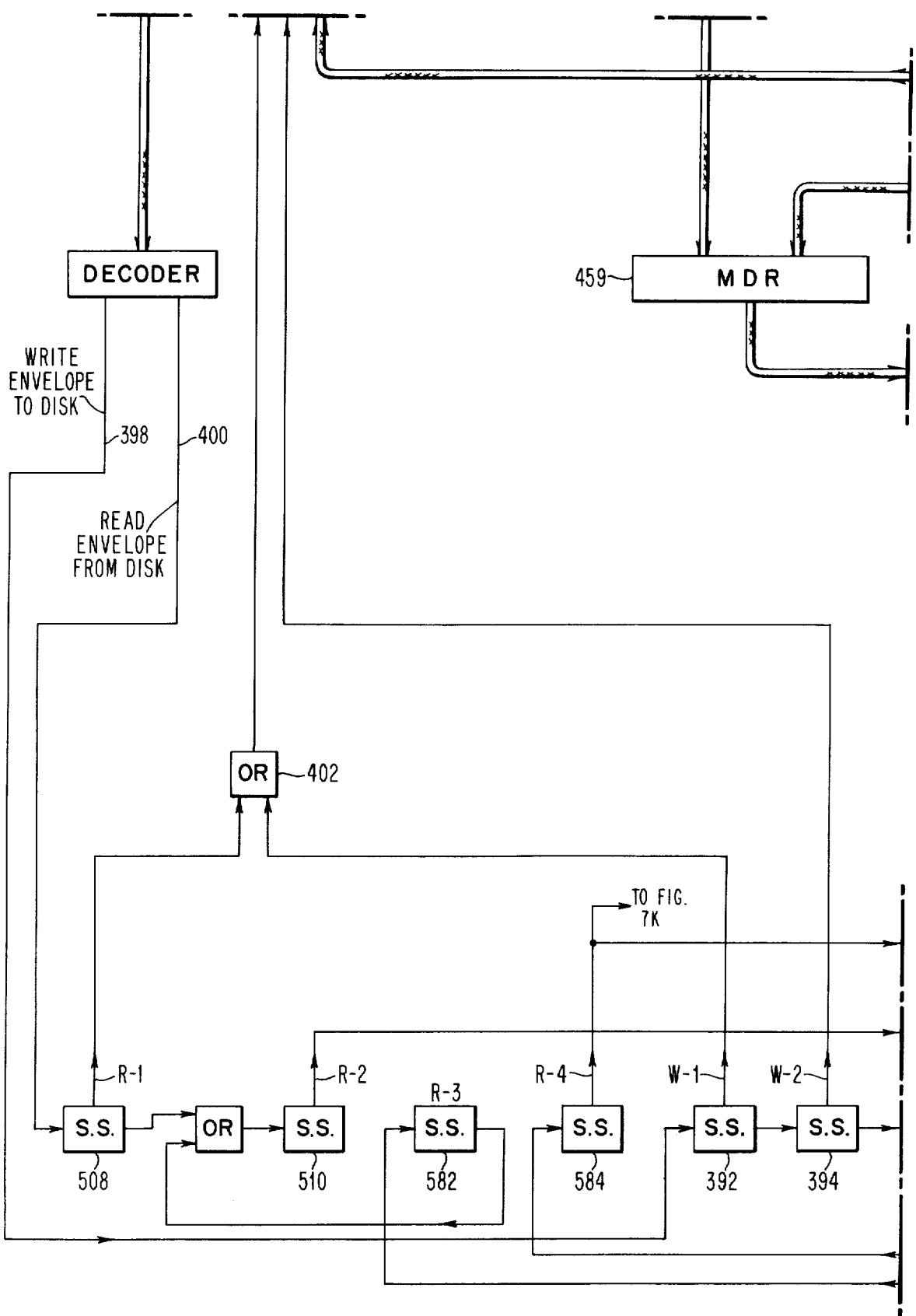
Figure 7D:
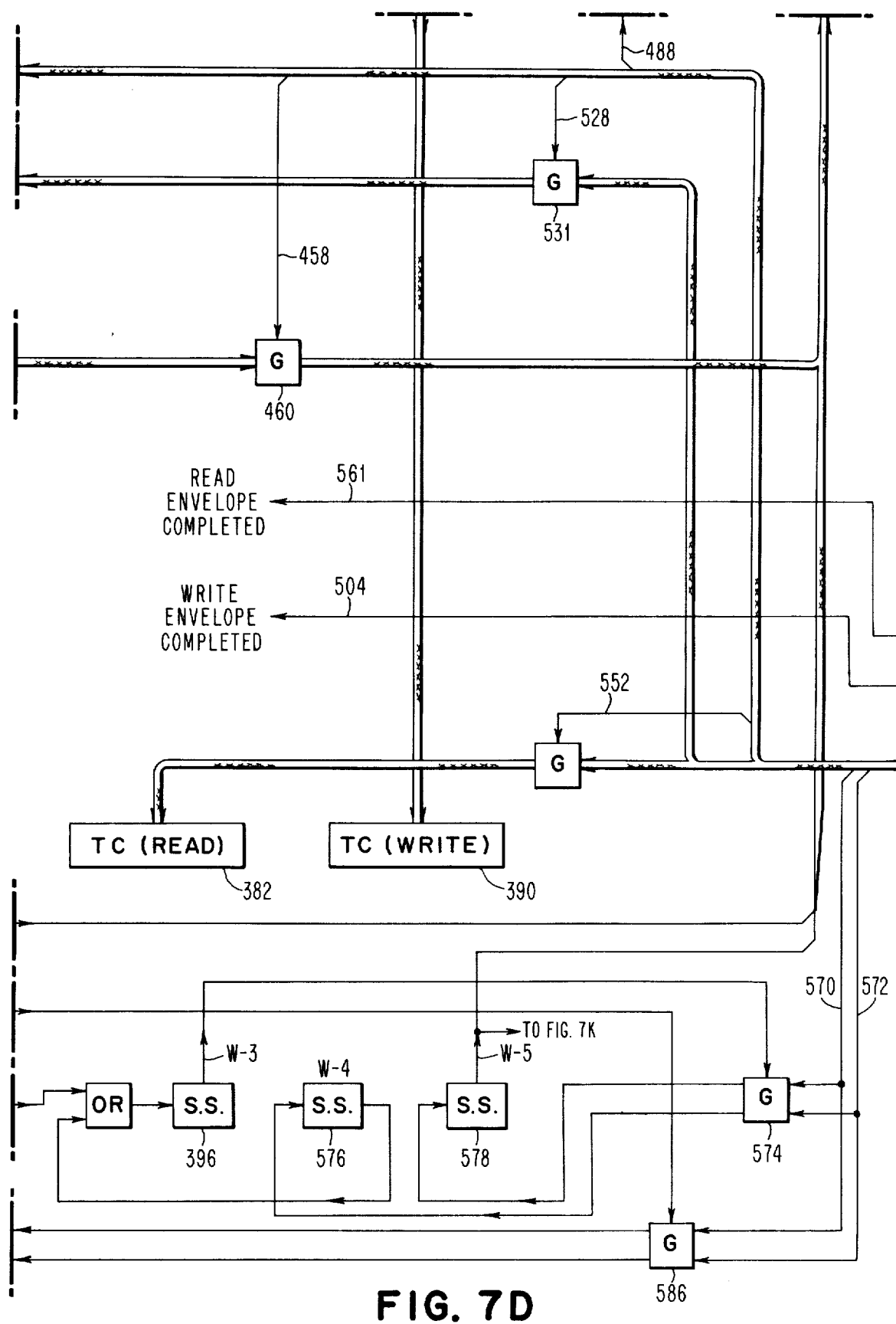

Two working registers 382 and 390 shown in FIG. 7D are referred to as the read and write TC register. These registers are available to the programmer via the FSC instruction described above and can be used to store away the time stamp word in any manner that the programmer pleases. For example, he can keep a list of all envelopes which exist and the times when these envelopes are read or written by him, by reading the contents of these registers and inserting the values in the list.

Figure 7E:
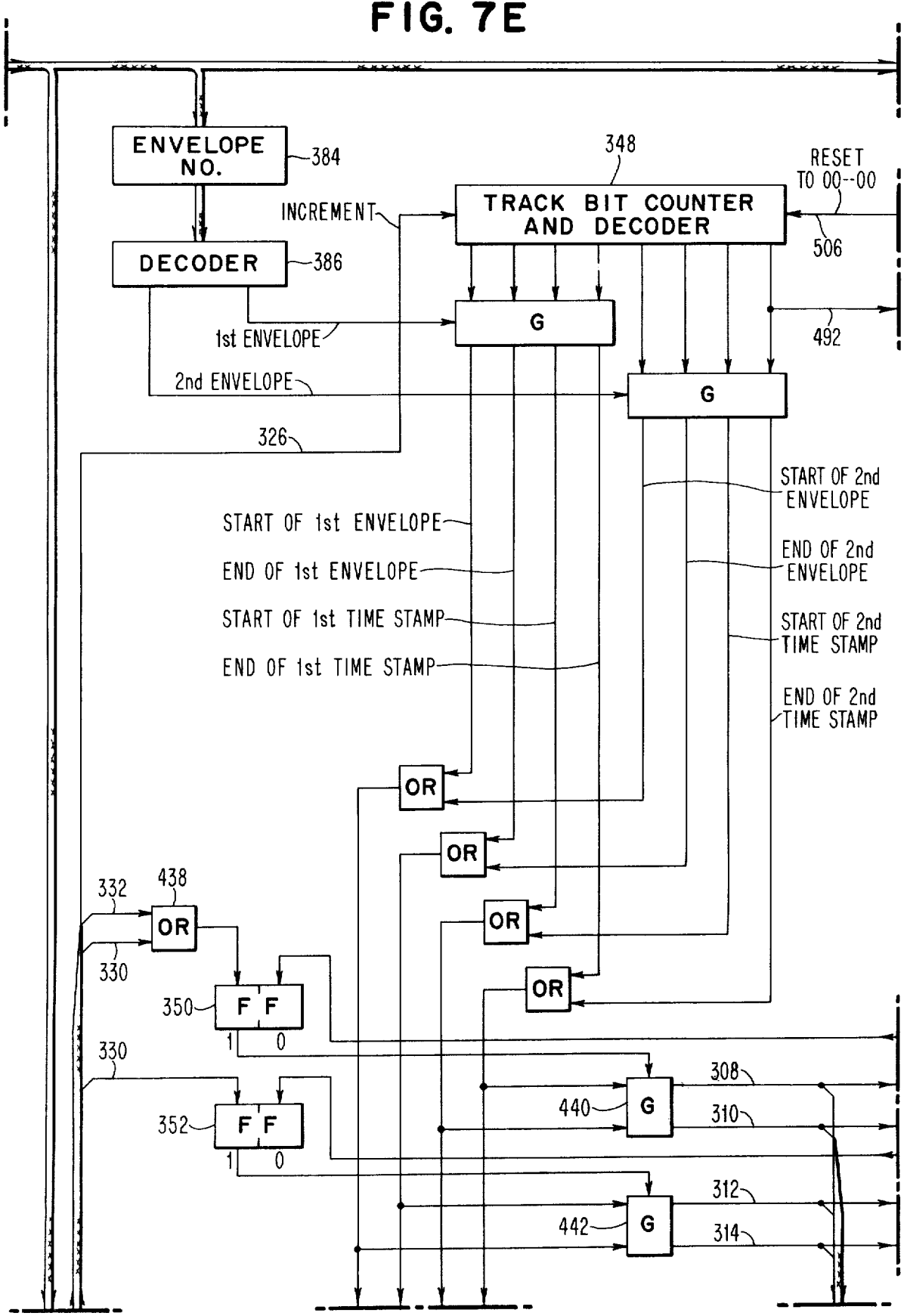
Figure 7G:
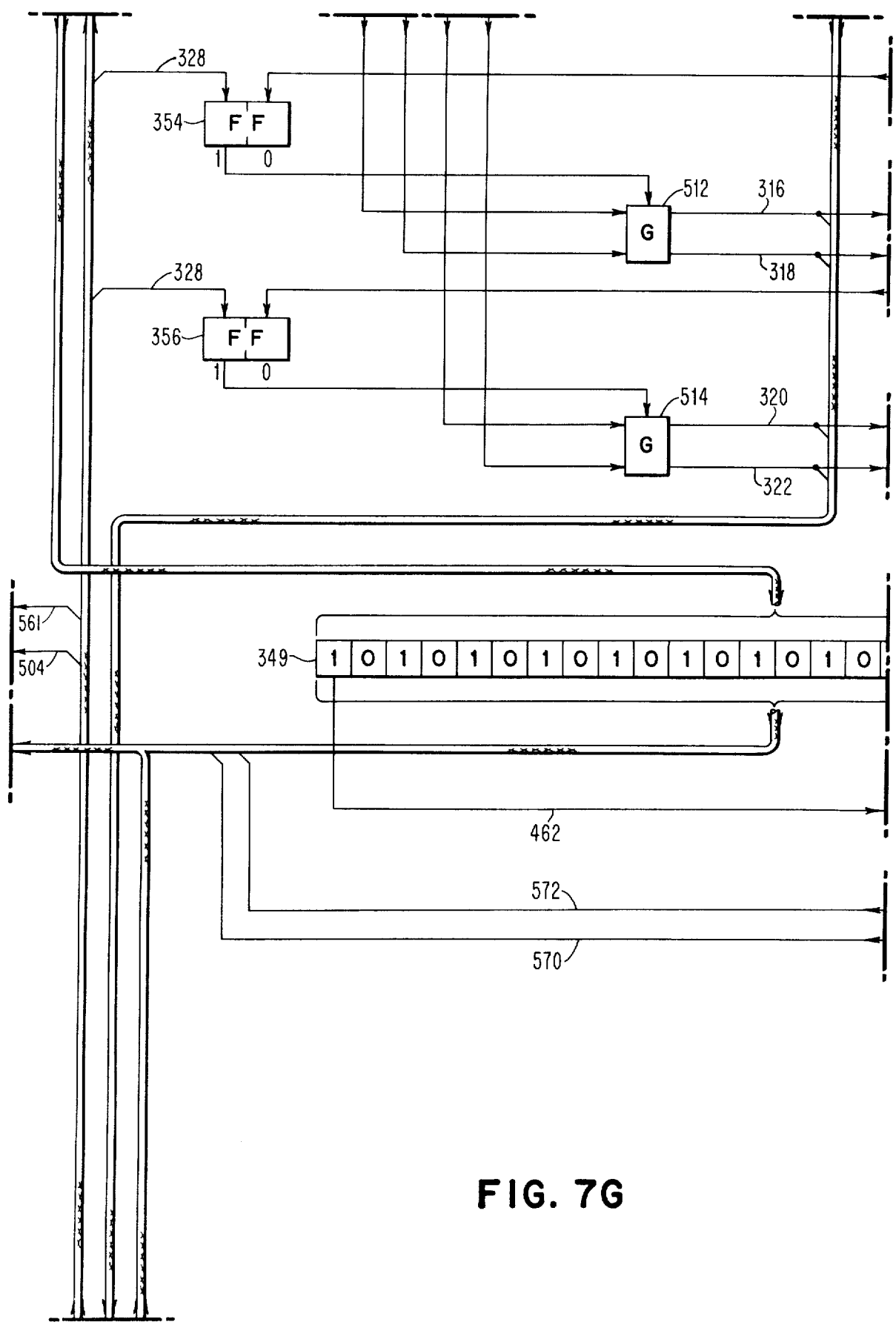
Figure 7H:
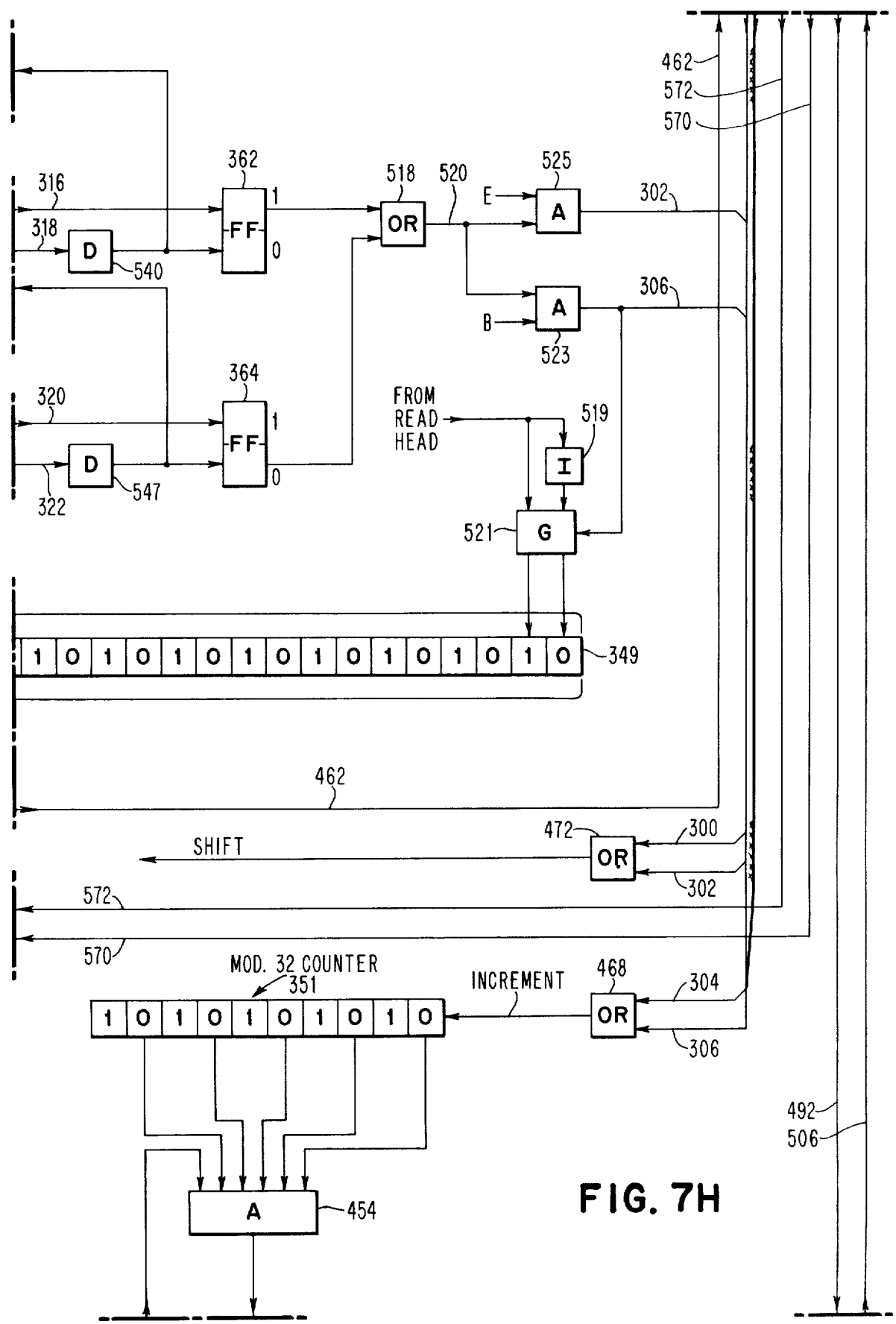
Figure 7I:
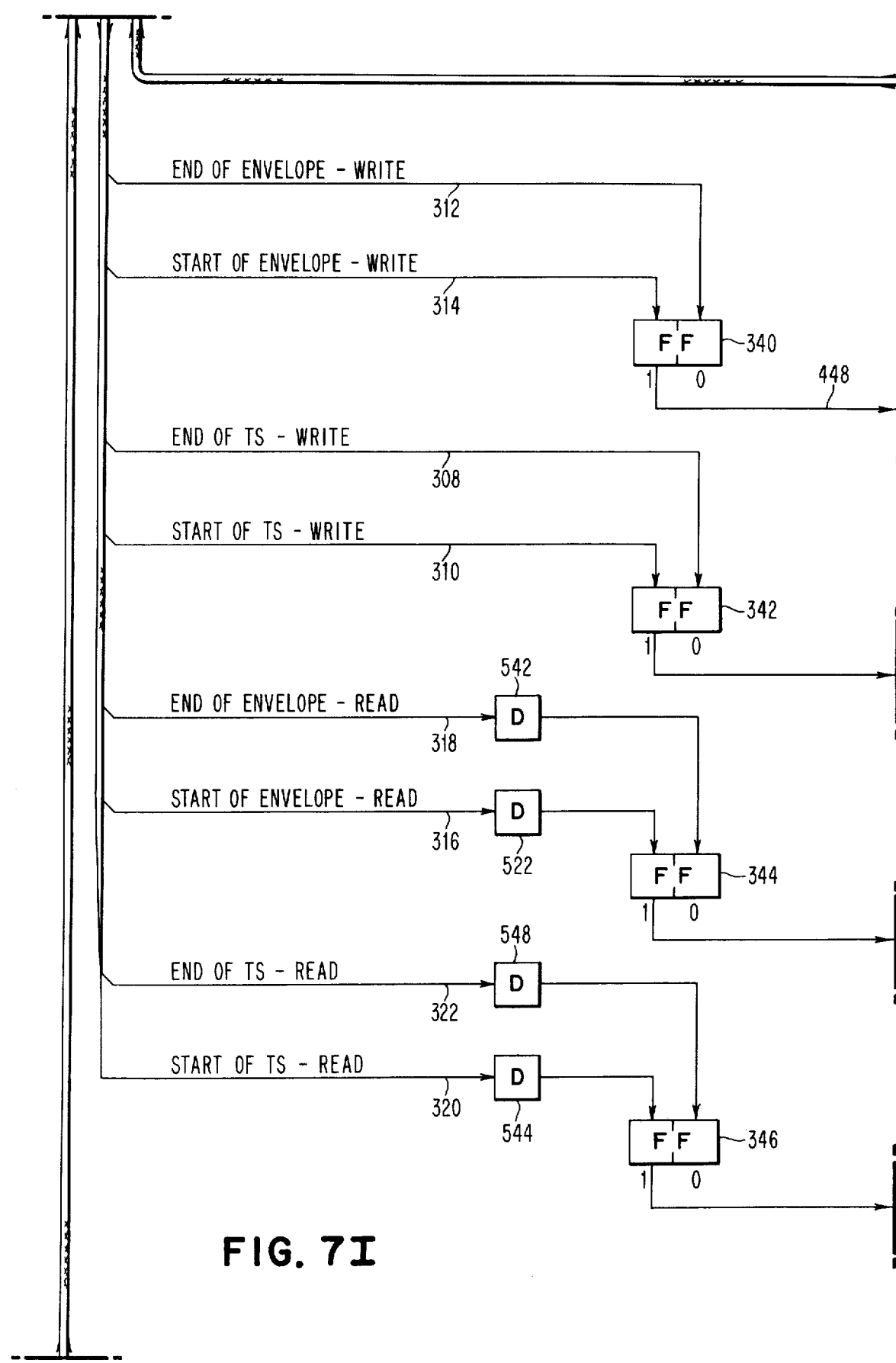
Figure 7J:
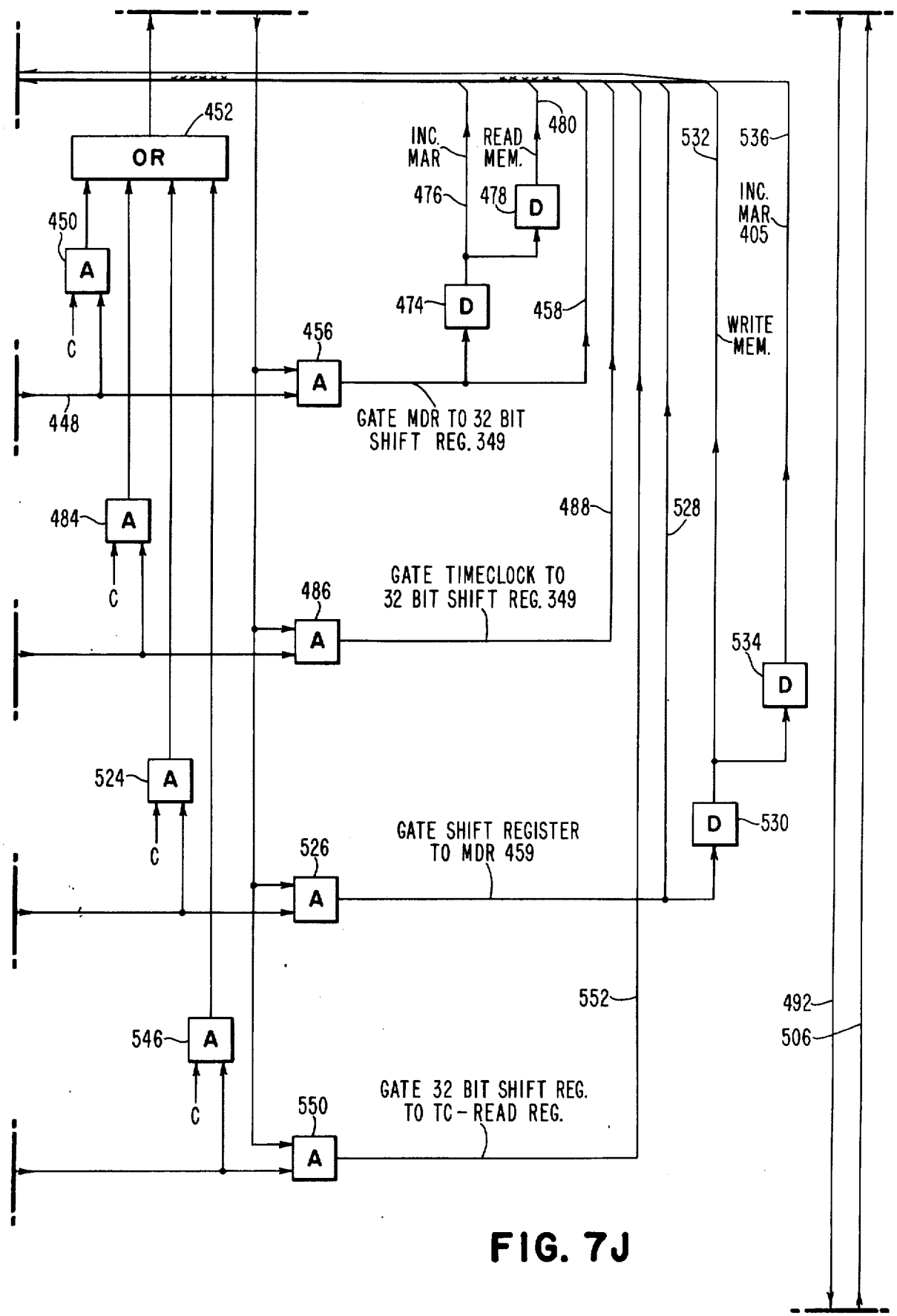

On FIG. 7E, a register 384 is provided for the envelope number in the track. This is decoded by the decoder 386 so that either the first envelope in the track or the second envelope in the track can be read or written. Another register 388 shown in FIG. 7F holds the track number and this controls the head positioning mechanism to move the access arm shown on FIG. 8 so that the read-write head is positioned on the proper track. A track bit counter and decoder 348 is provided in order to locate the proper envelope and proper time stamp in the track. On FIGS. 7G and 7H, a 32 bit shift register 349 is provided as a buffer between the memory data register 459 of the memory 377 shown on FIG. 7C and the disk. Also on FIG. 7H is a modulo 32 counter 351 which controls the transfer from and to the 32 bit shift register 349. FIGS. 7I, J, K and L contain control circuitry, the purpose of which will be explained hereinafter.

When an envelope is written on the disk, the old envelope is overwritten and the old time stamp is overwritten by the current time (clock). The time stamp that is written is also gated to the TC write register 390 on FIG. 7D. When an envelope is read, the envelope goes into the memory 377 and the time stamp goes into the TC read register 382. On the next revolution the current time stamp is written on the disk and this current time stamp goes into the TC write register 390.

The starting conditions for the disk file system shown in FIGS. 7A–7L are set forth in Table III below.

TABLE III

Starting Conditions for System
a) Track Bit Counter 348 (FIG. 7E) initially reset to 00...00
b) Flip-flops 350, 352 and 354 (FIG. 7E) initially reset to "0"
c) Flip-flops 358 and 360 (FIG. 7F) initially reset to "0"
d) Flip-flops 356, 362 and 364 (FIGS. 7G and 7H) initially reset to "0"
e) Mod. 32 counter (FIG. 7H) initially reset to 00000
f) Flip-flops 340, 342, 344 and 346 (FIG. 7I) initially reset to "0"
g) Flip-flop 366 (FIG. 7K) initially reset to "0"
h) Flip-flop 334 (FIG. 7L) initially reset to "0"
i) Flip-flop 414 (FIG. 7L) initially reset to "0"
j) Flip-flop 416 (FIG. 7L) initially reset to "0"

The first operation that will be described in detail is the writing of an envelope to the disk. As explained before, this requires only one revolution of the disk. Table IV below lists the microprogram for writing an envelope to the disk.

TABLE IV

WRITE AN ENVELOPE MICROPROGRAM

| | |
|---|---|
| W-1 | Gate starting address to memory address register 405 |
| | Gate track number to disk unit |
| | Gate envelope number to disk unit |
| W-2 | Read access command to memory 377 |
| W-3 | Is head in position on track? |
| | If yes, signal on line 570 and produce W-5 |
| | If no, signal on line 572 and produce W-4 |
| W-4 | Delay only, proceed to W-3 |
| W-5 | Set flip-flop 334 (FIG. 7L) to "1" |
| | Set flip-flop 338 (FIG. 7K) to "1" |
| | Set flip-flop 380 (FIG. 7B) to "1" |

When a "write envelope to disk" instruction is executed, a pulse appears on wire 398 which turns on single shot 392 shown in FIG. 7C. This produces the W-1 pulse which extends through OR circuit 402 to gate 404, shown in FIG. 7A, in order to gate the starting address in the memory 377 to the memory address register 405. A branch circuit from instruction register 376 extends to GATE 406 which gates the track number to register 388 on FIG. 7F. Register 388 is connected to a head positioning mechanism 389 to be described. Another branch circuit from instruction register 376 extends to GATE 408 which gates the envelope number in the track to register 384 on FIG. 7E. When single shot 392 turns off, a pulse is produced which turns on single shot 394 shown in FIG. 7C. This produces the W-2 pulse which extends through OR circuit 410 to give a read command to the memory 377. When single shot 394 turns off, a pulse is produced to turn on single shot 396. As shown in FIG. 7D, this produces the W-3 pulse which is applied to Gate 574 to check the position of the read-write head. If the head is not in position, a pulse will be produced from the active state of wire 572 out of the head positioning mechanism 389 shown in FIG. 7F to turn on single shot 576. Single shot 576 is used for delay only and when it turns off, a pulse is produced to again turn on single shot 396. If the head is positioned on the track, a pulse is produced from the active state of wire 570 out of the head positioning mechanism 389 to turn on single shot 578. This produces the W-5 pulse which extends to FIG. 7B and is used to set the flip-flop 380 to its 1 state. The W-5 pulse also extends to FIG. 7K where it extends through OR circuit 412 to set flip-flop 334, shown in FIG. 7L, to its 1 state. On FIG. 7K, the W-5 pulse is also used to set flip-flop 338 to its 1 state. Flip-flop 338 is the write flip-flop. From this point on, the writing of the envelope and the time stamp is under control of the disk unit.

Figure 7K:
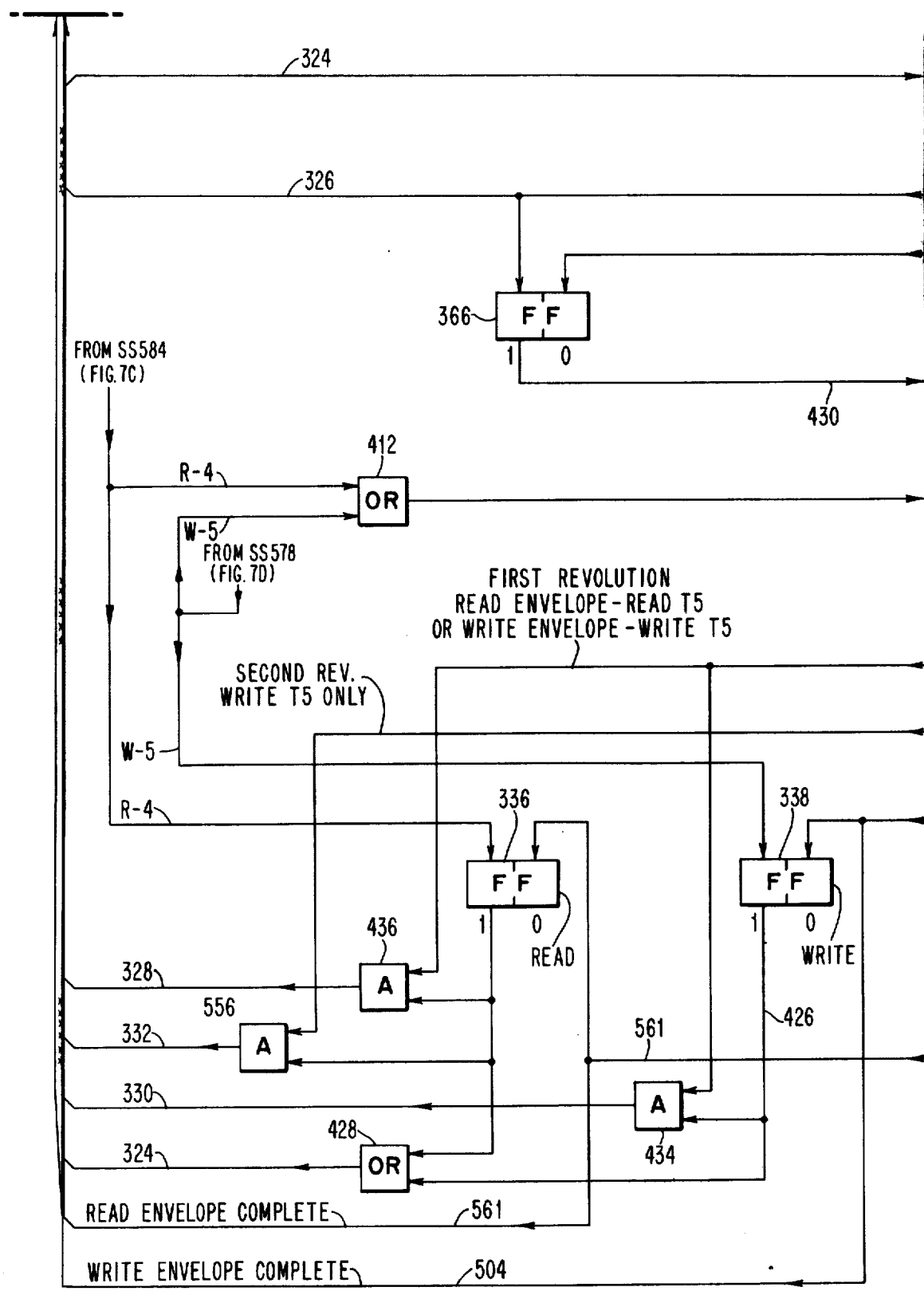
Figure 7L:
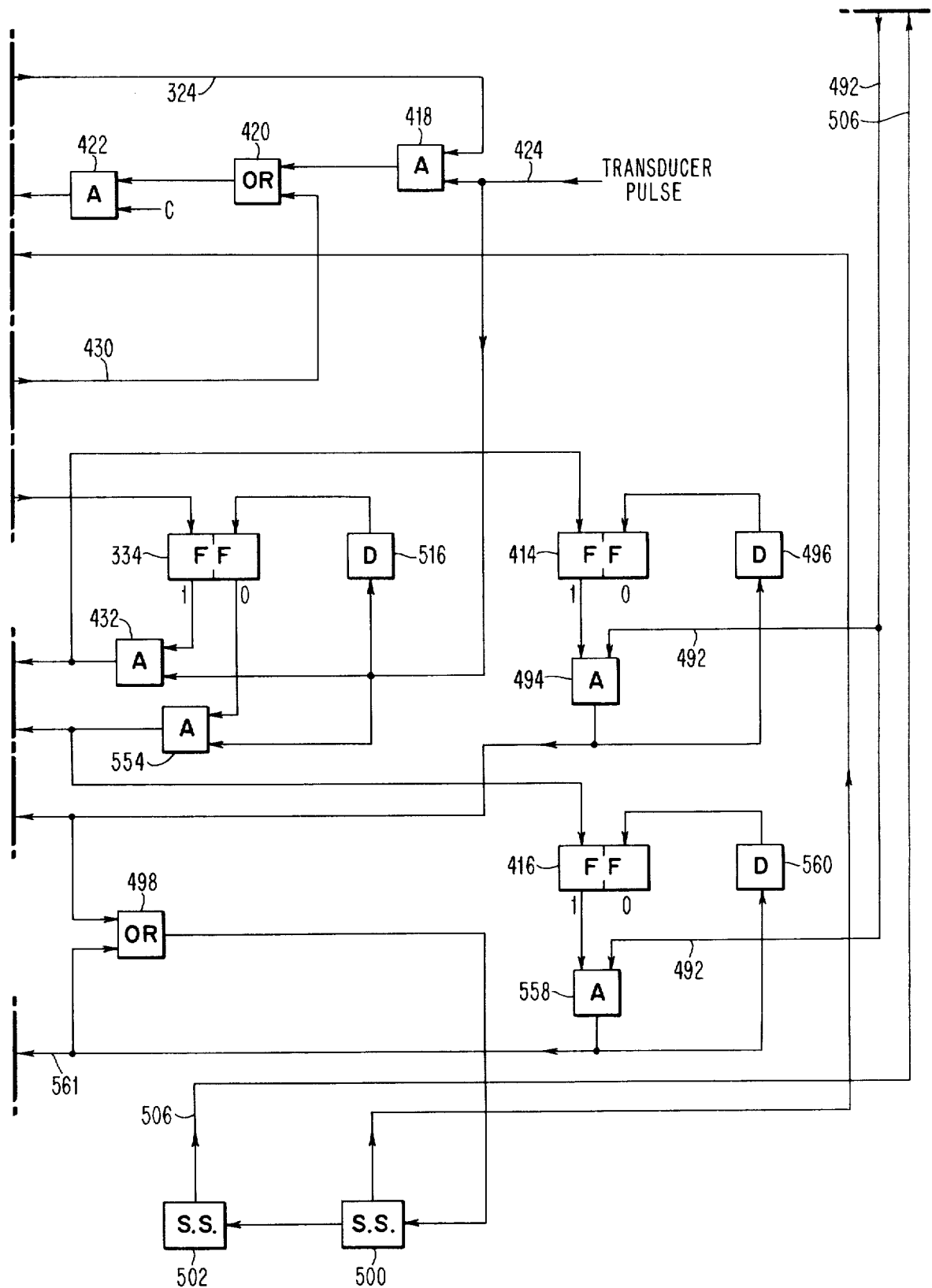

Referring to FIGS. 7K and 7L, because flip-flop 338 is in its 1 state, wire 426 will be active. The active state of this wire extends through OR circuit 428 to wire 324 which extends upwardly and is used to enable AND circuit 418. This enables the first transducer pulse which appears on wire 424 to extend through AND circuit 418 and OR circuit 420 to AND circuit 422. It was previously stated that the transducer pulse is exactly in phase with a clock C pulse. Therefore, it can be said that the first C pulse appears on wire 326 and will set flip-flop 366 to its 1 state, thus enabling wire 430, the active state of which will now extend through OR circuit 420 to enable AND circuit 422 as long as flip-flop 366 is in its 1 state. Thus, C pulses will continue to appear on wire 326 which extends to FIG. 7E and is used to increment the track bit counter 348. On FIGS. 7K and 7L, because flip-flop 334 is in its 1 state, AND circuit 432 will be enabled so that the same first transducer pulse will extend through AND circuit 432 to AND circuit 434 which is enabled by the active state of wire 426 and thus, a pulse will appear on wire 330 which extends to FIG. 7E and passes through OR circuit 438 to set flip-flop 350 to its 1 state. It should be mentioned that the pulse on wire 330 also sets flip-flop 352 to its 1 state.

Referring to FIGS. 7E and 7F, because flip-flop 350 is now in its 1 state, GATE 440 will be enabled. Also, because flip-flop 352 is in its 1 state, GATE 442 will be enabled. As mentioned before, the track bit counter 348 is being incremented by the C pulses. When this count reaches the start of the envelope to be written, a pulse will appear on wire 314. This pulse is similar to the pulse indicated by the reference character 368 in FIG. 11. The pulse on wire 314 sets flip-flop 360 to its 1 state, and this immediately causes wire 443 to be active thus, for example, enabling AND circuit 444. This permits the C pulses to extend through OR circuit 446 to the write head.

It will next be explained how the data pulses get to the write head. Referring to FIGS. 7H, I and J, the pulse on wire 314 out of gate 442 on FIG. 7E extends via cable to FIG. 7I where it is used to set flip-flop 340 to its 1 state. This causes wire 448 to become active which enables AND circuit 450. The first C pulse which is applied to AND circuit 450 is generally the same sort of pulse shown by reference character 368 in FIG. 11. This C pulse extends through OR circuit 452 and passes through AND circuit 454. The AND circuit 454 is enabled because the modulo 32 counter 351 is initially in its all 0's state. The output of AND circuit 454 extends to AND circuit 456, which also is enabled by the active state of wire 448, and extends to wire 458 which extends back via cable to FIG. 7D and is applied to GATE 460 in order to gate the memory data register 459 to the 32 bit shift register 349. On FIGS. 7G and 7H, the 1 side of the left hand flip-flop of the 32 bit shift register 349 extends via wire 462 to AND circuit 464 on FIG. 7F. This AND circuit 464 is enabled by the B pulse shown in FIG. 10. Thus, if the left-most bit in the 32 bit shift register 349 happens to be a 1, a pulse will extend through AND circuit 464, and OR circuit 446 to the write head. In this manner a 1 is written on the disk. If the left-most bit in the 32 bit shift register is a 0 then, of course, no bit will be written in the bit cell of the disk track. On FIG. 7F, the B pulses are applied to AND circuit 466 and, in this manner, they appear on wire 304 which extends through OR circuit 468 on FIG. 7H in order to increment the modulo 32 counter 351. On FIG. 7F, E pulses extend through AND circuit 470 to wire 300 which extends to FIG. 7H and passes through OR circuit 472 in order to shift the 32 bit shift register 349 one place to the left. On FIG. 7J, the pulse that appeared on wire 458 is delayed by the DELAY UNIT 474 and appears on wire 476 which extends to FIG. 7A and is used to increment the memory address register 405. When this is accomplished, a pulse appears on the output of DELAY unit 478 in FIG. 7J and appears on wire 480 which extends to FIG. 7A and passes through OR circuit 410 to provide a read command to the memory. Recording on the disk continues until the 32 bits on the shift register 349 are used up. At this time the modulo 32 counter 351 will again be at all zeros and the next C pulse applied to AND circuit 450 on FIG. 7J will be effective to again gate the memory data register 459 on FIG. 7C to the 32 bit shift register 349. Operations will continue until the pulse which indicates the end of the envelope is encountered. This pulse comes from the track bit counter 348 on FIG. 7E and appears on wire 312. This pulse is the equivalent of the pulse indicated by the reference character 370 on FIG. 11. An examination of FIG. 11 will show that there is one data bit which can follow the pulse indicated by the reference character 370. Because of this last data pulse, the DELAY unit 482 is included on FIG. 7F to delay the pulse on wire 312 in resetting flip-flop 360 to its 0 state. This is because it is necessary to keep wire 443 active long enough so that the last B pulse can gate a possible 1 through AND circuit 464 and OR circuit 446 to the write head. The output of DELAY unit 482 is used to reset flip-flop 352, shown in FIG. 7E, to its 0 state. Because no more transfers are necessary from the memory data register 459 to the 32 bit shift register 349, the pulse on wire 312 appears on FIG. 7I and is used to reset flip-flop 340 to its 0 state. This disables AND circuits 450 and 456, shown in FIG. 7J, so that no more C pulses get through to accomplish the transfer, incrementing of the memory address register 405 and causing read accesses of the memory. In this manner, the envelope is written on the disk.

The disk will continue rotating until the start of the time stamp is encountered. This will produce a pulse on wire 310 on FIGS. 7E and 7F, this pulse being similar to the pulse indicated by the reference character 372 on FIG. 11. The pulse on wire 310 sets flip-flop 358 to its 1 state which causes wire 443 to again become active. On FIGS. 7I and 7J, the pulse on wire 310 sets flip-flop 342 to its 1 state which enables AND circuits 484 and 486. This means that the same C pulse that appeared on wire 310 will pass through AND circuit 484 and through OR circuit 452 to AND circuit 454. AND circuit 454 will have an output because the modulo 32 counter 351 is all zeros and this will cause AND circuit 486 to have an output which appears on wire 488. Wire 488 extends to FIG. 7B where it is applied to gate 490 in order to gate the time interval clock-counter 378 and the indicator bit 380 to the 32 bit shift register 349. The pulse on wire 488 is also applied to gate 491 in order to gate the time interval clock-counter 378 to the TC WRITE register 390 shown in FIG. 7D. The writing of the time stamp will now continue from the 32 bit shift register 349 in a manner similar to that described before. When the end of the time stamp is encountered, a pulse will appear on wire 308 in FIGS. 7E and 7F. The pulse on wire 308 is equivalent to the pulse indicated by the reference character 374 on FIG. 11. The delay unit 490 is provided in order to get the last bit which immediately follows this pulse on wire 308. The output of delay unit 490 resets flip-flop 358 to its 0 state and also resets flip-flop 350 to its 0 state. On FIG. 7I, the pulse on wire 308 resets flip-flop 342 to its 0 state and thus inhibits any further action of AND circuits 484 and 486.

The way in which the write operation is terminated is as follows. Referring to FIG. 7L, when the transducer pulse appeared on wire 424, it passed through AND circuit 432 and set flip-flop 414 to its 1 state. This enables AND circuit 494 so that when a pulse appears on wire 492, which will happen when the end of the last time stamp is encountered on the disk, AND circuit 494 will have an output which will reset flip-flop 338 to its 0 state. The same output of AND circuit 494 will extend through the delay unit 496 to reset flip-flop 414 to its 0 state. The same pulse out of AND circuit 494 will appear on wire 504 which extends back to FIG. 7D and is a signal to the computer that the operation of writing the envelope has been completed. Also, on FIG. 7L, OR circuit 498 will have an output to turn on single shot 500. The pulse produced by this single shot will reset flip-flop 366 to its 0 state. On FIG. 7F, when single shot 500 turns off, a pulse is produced to turn on single shot 502. This produces a pulse on wire 506 which is used to reset the track bit counter 348 in FIG. 7E.

The operation of reading an envelope from the disk will next be described. It will be remembered that this requires two revolutions of the disk. During the first revolution, the envelope is read into the memory 377 on FIG. 7A, and the time stamp is read into the TC read register 382 on FIG. 7D. In the second revolution, the time interval clock-counter 378 and the indicator bit 380 is written into the time stamp space for the envelope on the disk, as shown in FIG. 7B. Table V below lists the microprogram for reading an envelope from the disk.

TABLE V

| | READ AN ENVELOPE MICROPROGRAM |
|---|---|
| Start | By pulse from operator code decoder (FIG. 7A, 7C) |
| R-1 | Gate starting address to MAR 405 |
| | Gate track number to disk unit |
| | Gate envelope number to disk unit |
| R-2 | Is head in position on track? |
| | If yes, signal on line 570 and produce R-4 |
| | If no, signal on line 572 and produce R-3 |
| R-3 | Delay only, proceed to R-2 |
| R-4 | Set flip-flop 334 (FIG. 7L) to "1" |
| | Set flip-flop 336 (FIG. 7K) to "1" |
| | Set flip-flop 380 (FIG. 7B) to "0" |

A "read envelope from disk" instruction is initiated from the instruction register 376 by a pulse on wire 400 (FIGS. 7A and 7C). This pulse turns on single shot 508 which produces the R-1 pulse. This pulse extends through OR circuit 402 to gates 404, 406 and 408 and performs the same gating as was described before. When single shot 508 turns off, a pulse is produced to turn on single shot 510. This produces the R-2 pulse which is applied to gate 586 on FIG. 7D in order to check the position of the read-write head. If the head is not in position, a pulse will be produced from the active state of wire 572 to turn on single shot 582. Single shot 582 is used for delay only and when it turns off, a pulse is produced to again turn on single shot 510. If the head is positioned on the track, a pulse is produced from the active state of wire 570 to turn on single shot 584. This produces the R-4 pulse which extends to FIG. 7B and is used to set flip-flop 380 to its 0 state. The R-4 pulse also extends to FIG. 7K where it extends through OR circuit 412 to set flip-flop 334 to its 1 state. On FIG. 7K, the R-4 pulse is also used to set flip-flop 336 to its 1 state. Flip-flop 336 is the read flip-flop. On FIG. 7F, the transducer pulse which appears on wire 424 is again effective to produce clock pulses on wire 326 which are used to increment the track bit counter 348 on FIG. 7C. The transducer pulse will also extend through AND circuit 432, AND circuit 436 to wire 328 which extends to FIG. 7C and is used to set flip-flops 354 and 356 to their 1 states. On FIG. 7D, gates 512 and 514 will be enabled. It will be shown how the reading of the envelope is controlled by gate 512 and reading of the time stamp is controlled by gate 514. This was made possible by the transducer pulse which appears on wire 424, producing an output on AND circuit 432 in FIG. 7F. It should also be noted that the output of AND circuit 432 sets flip-flop 414 to its 1 state. It should be observed that the first transducer pulse extends through the delay circuit 516 to reset flip-flop 334 to its 0 state.

The operation of reading from the disk involves loading the 32 bit shift register on FIG. 7D from the read head and then transferring the 32 bit shift register 349 to the memory data register 459 after which the store operation follows in order to store the word in memory. The memory address register 405 is then incremented to prepare for the next 32 bit word. The way in which this is accomplished is as follows. When the start of the envelope is encountered, decoder 386 will provide a signal which is gated to produce a pulse on wire 316 (FIGS. 7E, G and H). This is equivalent to the pulse 368 on FIG. 11. When this happens, flip-flop 362 will be set to its 1 state and OR circuit 518 will have an output to cause wire 520 to become active. The first data pulse from the read head will be gated by inverter 519 and gate 521 into the right-most flip-flop of the shift register 349 by the B pulse at gate 523 which causes wire 306 to become active at B time. It will be noted that wire 306 is also used to increment the modulo 32 counter 351. E pulses are also produced via gate 515 on wire 302 which extends through OR circuit 472 to shift the 32 bits in shift register 349. Going back to the pulse on wire 316, it will be noted that, on FIG. 7I, this pulse is delayed by delay circuit 522 to set flip-flop 344 to its 1 state. The reason for the delay circuit 522 is to prevent the first C pulse, which is the equivalent of the pulse 368 on FIG. 11, from gating the shift register 349 to the MDR 459 as it is not desired to do this until the first 32 bits have been loaded into the shift register. The delay circuit 522 also inhibits the action of the AND circuit 454, via flip-flop 344, gate 524 and gate 452, so that it is not enabled at this initial time. The first B pulse following the first C pulse which, as mentioned before, is the equivalent of pulse 368 on FIG. 11, will increment the modulo 32 counter 351 so that AND circuit 454 cannot be enabled until the first 32 bits have been loaded into the shift register 349. When 32 bits have been loaded into the shift register the next C pulse will be effective through gate 524, OR circuit 452, AND circuit 454 and AND circuit 526 to put a pulse on wire 528 which extends from FIG. 7J to FIG. 7D and is applied to gate 531 in order to gate the shift register 349 to the memory data register 459. This same pulse will extend through delay unit 530 to wire 532 which extends from FIG. 7J to FIG. 7A and is used to give the write command to the memory 377. This pulse is again delayed by the delay unit 534 which produces a pulse on wire 536 which also extends to FIG. 7A and is used to increment the memory address register 405. In this manner, the 32 bit shift register 349 is loaded from the disk and transferred to the memory as many times as required. These operations will occur as many times as needed until the end of the envelope appears. When this happens, a pulse will appear on wire 318 on FIG. 7H. The pulse on wire 318 is the equivalent of the pulse labeled 370 on FIG. 11 and it will be noted that there is still one data bit following this pulse. This is the reason for the delay circuit 540 on FIG. 7H which delays the resetting of flip-flop 362 until the next B pulse can gate the last data bit into the right-hand flip-flop of the 32 bit shift register 349. It will be noted that the delay of the delay unit 540 is just sufficient to catch the next B pulse. On FIGS. 7I and 7J, the pulse on wire 318 is applied to delay unit 542. This delay unit has to delay the pulse long enough to catch the next C pulse which now can extend through AND circuit 524, OR circuit 452, AND circuit 454, and AND circuit 526 to wire 528 in order to gate the last 32 bits from the 32 bit shift register 349 to the memory data register 459. A pulse follows on wire 532 in order to give a write command to the memory. In this manner, the last 32 bits are stored in the memory. A succeeding pulse appears out of delay unit 534 on wire 536 to increment the memory address register 405, but this is ineffective at this time.

The rotation of the disk continues until the start of the time stamp is encountered. The track bit counter 348 causes a pulse on wire 320 on FIG. 7H, which is effective to set flip-flop 364 to its 1 state and again make wire 520 active. This pulse on wire 320 is the equivalent of the pulse indicated by the reference character 372 on FIG. 11. On FIGS. 7I and 7J, the pulse on wire 320 is delayed by the delay unit 544 to set flip-flop 346 to its 1 state. The reason for the delay is to prevent the C pulse which occurs at the same time as the pulse on wire 320 from extending through AND circuit 546. The 32 bits in the time stamp section are loaded into the 32 bit shift register 349 and when the end of the time stamp is encountered, which means that a pulse will appear on wire 322, this pulse will be delayed by the delay unit 547 on FIG. 7H in order to delay the reset of flip-flop 364 so that the active state of wire 520 will remain long enough to get the first data bit following this end of time stamp signal. On FIGS. 7I and 7J, the pulse on wire 322 is delayed by the delay unit 548 to delay the reset of flip-flop 346 so that the following C pulse will be effective through AND circuit 546, OR circuit 452, AND circuit 454 and AND circuit 550 to wire 552 which extends to FIG. 7D in order to gate the 32 bit shift register 349 to the register TC read 382.

The first revolution of the disk then continues until the end of the last time stamp is encountered when a pulse appears on wire 492. On FIG. 7L, because flip-flop 414 was set to its 1 state by the transducer pulse, the pulse on wire 492 will extend through AND circut 494 and OR circuit 498 to turn on single shot 500. This produces a pulse which is used to reset flip-flop 366 to its 0 state. The same pulse also sets flip-flop 338 to its 0 state but this does not harm at this time because flip-flop 338 was already in its 0 state. When single shot 500 turns off a pulse is produced to turn on single shot 502. This produces a pulse on wire 506 which extends to FIG. 7E and resets the track bit counter 348. The rotation of the disk continues until the transducer pulse occurs for the second time. It will be remembered that the first transducer pulse on wire 424 extended through delay circuit 516 in FIG. 7L to set flip-flop 334 to its 0 state. This causes AND circuit 554 to become enabled so that when the second transducer pulse occurs on wire 424 it now extends through AND circuit 554 to set flip-flop 416 to its 1 state. The same pulse extends out of AND circuit 554 through AND circuit 556 to wire 332 on FIG. 7K which extends through OR circuit 438 on FIG. 7E to set flip-flop 350 to its 1 state. It will be remembered that flip-flop 350 when in its 1 state enables gate 440 which controls the writing of the time stamp. This writing of the time stamp has been previously described. The only thing different that occurs this time is that when the pulse appears or wire 492 on FIG. 7L it now extends through AND ccircuit 558 because flip-flop 416 is set to 1 on the second revolution whereas flip-flop 414 was set to 1 on the first revolution. The output of AND circuit 558 resets flip-flop 336 on FIG. 7K to its 0 state and produces a pulse on wire 561. Wire 561 extends to FIG. 7D and the signal on it indicates to the computer that the reading of an envelope from the disk has been completed. The output of AND circuit 558 also connects to the reset side of flip-flop 416 via a delay unit 560. On FIG. 7L, the output of AND circuit 558 also extends through OR circuit 498 to turn on single shot 500 which causes flip-flop 366 to be reset to its 0 state. When single shot 500 turns off a pulse is produced to turn on single shot 502 which produces a pulse on wire 506 which extends to FIg. 7E and is used to reset the track bit counter 348. In this manner, a read envelope operation is accomplished.

In summary, the disk file structure shown in FIGS. 7A-7L includes a time stamp memory element or space reserved along with each envelope of data in the disk. This reserved space contains the time code indicating when the envelope was last read from the disk or the time when the envelope was last written onto the disk. Additionally, an access bit memory element associated with each disk envelope can be used to indicate if the last access to the envelope was a write or a read access. The read and write TC registers 382 and 390 are working registers used to store the time stamp word associated with the reading and writing of an envelope. Such TC registers 382 and 390 ae are to the programmer and can be used to store the time stamp word in any desired manner, such as in a table listing the envelopes and the times when accessed by the programmer.

When an envelope is written on the disk, the old envelope is overwritten and the old time stamp is overwritten. As an envelope is written on the disk, the time code from the time clock is gated into the associated time stamp memory element on the disk and written therein. This current time stamp also is entered into the TC write register 390 for availability to the programmer.

The operation of reading from the disk involves loading a shift register from the read head and then transferring its contents to a memory data register after which the store operation follows in order to store the word in memory. When the complete envelope of data is transferred from the disk via the registers into memory, the time stamp code that was stored in the disk time stamp memory element associated with the envelope is gated to the TC read register 382. This enables readout of the last time when the envelope was accessed. In addition, on the next revolution of the disk, the current time code from the time clock is written into the time stamp memory element of the disk to indicate when the new or current read of the envelope occurred. This current time code is also entered into the TC write register 390. Thus, the programmer has access to both the TC read register 382 to obtain the time when the envelope was last accessed, as well as to the TC write register 390 to obtain the new time when the envelope is being read.

Although the above description is directed to preferred embodiments of the invention, it is noted that other variations and modifications will be apparent to those skilled in the art and, therefore, may be made without departing from the spirit and scope of the present invention.

What is claimed is:

1. A data security system for detecting security violations for programs and data within a data processing system, comprising:
 a memory containing a plurality of storage sections;
 time stamp storage means including a plurality of storage elements each of which is associated with a respective storage section of said memory;
 addressing means for locating both the memory storage section being read or written into as well as locating its associated time stamp storage element;
 a continuously running clock providing a code indicating the time of day and date;
 instruction register means for indicating the presence of system instructions for reading data from or writing data into said memory storage sections thus activating said addressing means; and
 time stamp gating means, responsive to a data read or write instruction in said instruction register means, for entering the current time code from said clock into the addressed time stamp storage element associated with the data memory section being read from or written into;
 time stamp retrieval means, for retrieving the time clock code from the time stamp storage elements selected by said addressing means, the retrieved time code having been stored in said addressed time stamp storage mans as a result of an access thereto which immediately preceded the current access;
 whereby the system indicates the time when the last read or write of data to each memory section occurred.

2. System as recited in claim 1 wherein said memory contains a plurality of storage sections on a disc storage, and said time stamp storage means comprises a portion of said disc storage including said time stamp storage elements on said disc storage.

3. System as recited in claim 1 wherein said addressing means includes a memory address register for storing the address location of the memory storage section for the data being read from or written into, a portion of said address including higher order bits for addressing the time stamp storage element associated with said memory storage section.

4. System as recited in claim 1 wherein said instruction register means includes a register section for storing the operation code for the system CPU, said operation code including instructions for reading or writing data into said memory storage sections, and instructions for retrieving the time clock code from said time stamp storage elements.

5. System as recited in claim 4 wherein said time stamp retrieval means includes decoding means for detecting, in said instruction register, instructions for retrieving the time clock code and forwarding said retrieved time clock code into a special purpose register in the system CPU.

6. System as recited in claim 1 wherein each of said storage elements in said time stamp storage means includes a read/write indication field for indicating whether the time code stored in a particular storage element is associated with either a read or write operation of data within the associated data storage section, said read/write field receiving its read or write indication from said instruction register.

7. System as recited in claim 1, wherein said memory includes virtual memory means 8. A data security system for detecting security violations for programs and data within a data processing system, comprising:
 a memory containing a plurality of storage sections;
 time stamp storage means including a plurality of storage elements, each of which is associated with a respective storage section of said memory;
 addressing means for locating both the memory storage section being read or written into as well as locating its associated time stamp storage elements said addressing means including a memory address register for storing the address location of the memory storage section for the data being read from or written into, a portion of said address including higher order bits for addressing the time stamp storage element associated with said memory storage section;

a continuously running clock providing a code indicating the time of day and date;

instruction register means for indicating the presence of system instructions for reading data from or writing data into said memory storage sections thus activating said addressing means; and time stamp gating means, responsive to a data read or write instruction in said instruction register means, for entering the current time code from said clock into the addressed time stamp storage element associated with the data memory section being read from or written into;

time stamp retrieval means, for retrieving the time clock code from the time stamp storage elements addressed by said higher order bits of said memory address register, the retrieved time code having been stored in said addressed time stamp storage jmans as a result of an access thereto which immediately preceded the current access;

whereby the system indicates the time when the last read or write of data to each memory section occurred.

* * * * *